US010486250B2

(12) United States Patent
Petersson et al.

(10) Patent No.: US 10,486,250 B2
(45) Date of Patent: Nov. 26, 2019

(54) ELECTRIC CUTTING SYSTEM

(71) Applicant: HUSQVARNA AB, Huskvarna (SE)

(72) Inventors: Ulf Petersson, Tollered (SE); Bengt Allan Bergvall, Jönköping (SE); Håkan Pinzani, Göteborg (SE); Pär Carlsson, Göteborg (SE); Adam Vidlund, Gråbo (SE); Johan Berg, Alingsås (SE); Anders Bennehag, Göteborg (SE)

(73) Assignee: HUSQVARNA AB, Huskvarna (SE)

( * ) Notice: Subject to any disclaimer, the term of this patent is extended or adjusted under 35 U.S.C. 154(b) by 237 days.

(21) Appl. No.: 15/491,194

(22) Filed: Apr. 19, 2017

(65) Prior Publication Data
US 2017/0216941 A1 Aug. 3, 2017

Related U.S. Application Data

(63) Continuation of application No. 14/407,534, filed as application No. PCT/SE2013/050682 on Jun. 12, 2013, now Pat. No. 9,656,336.

(30) Foreign Application Priority Data

Jun. 12, 2012 (SE) ..................................... 1250614
May 8, 2013 (SE) ..................................... 1350571

(51) Int. Cl.
B23D 45/16 (2006.01)
B23D 47/00 (2006.01)
(Continued)

(52) U.S. Cl.
CPC .............. B23D 45/16 (2013.01); B23B 45/02 (2013.01); B23D 47/005 (2013.01); B23D 47/12 (2013.01);
(Continued)

(58) Field of Classification Search
CPC ....................................................... B23D 45/16
(Continued)

(56) References Cited

U.S. PATENT DOCUMENTS 2,011,341 A 8/1935 Mendenhall et al.
2,781,035 A 2/1957 Loecy, Jr.
(Continued)

FOREIGN PATENT DOCUMENTS

AU 2013274951 A1 2/2015
CA 2876579 A1 12/2013
(Continued)

OTHER PUBLICATIONS

International Search Report and Written Opinion for International Application No. PCT/SE2013/050682 dated Dec. 19, 2013.
(Continued)

Primary Examiner — David Luo
(74) Attorney, Agent, or Firm — Burr & Forman LLP

(57) ABSTRACT

An electric power saw/cutter includes a rotatable saw structure, a rear handle with a switch/speed control, a front handle, and a drive unit for rotating the saw structure. The drive unit includes a saw structure drive arrangement to which the saw structure is attachable, a transmission for driving the saw drive arrangement, an electric motor for driving an input shaft of the transmission, and a support structure for holding/carrying the saw structure drive arrangement. The transmission and the electric motor may be characterized in that the front handle and the rear handle are directly connected to each other to form a handle unit, which unit is resiliently connected to the drive unit, so that vibrations from the saw blade and drive unit will be reduced in the handle unit.

20 Claims, 22 Drawing Sheets

(51) Int. Cl.
| | |
|---|---|
| *B23D 47/12* | (2006.01) |
| *B23D 59/02* | (2006.01) |
| *B28D 7/02* | (2006.01) |
| *B27B 17/00* | (2006.01) |
| *B25F 5/00* | (2006.01) |
| *B23Q 11/10* | (2006.01) |
| *B27B 17/08* | (2006.01) |
| *B23B 45/02* | (2006.01) |
| *B23D 57/00* | (2006.01) |
| *B24B 7/18* | (2006.01) |
| *H02K 1/27* | (2006.01) |
| *H02K 5/20* | (2006.01) |
| *H02K 7/14* | (2006.01) |
| *H02K 9/19* | (2006.01) |
| *H02P 27/06* | (2006.01) |

(52) U.S. Cl.
CPC ......... *B23D 57/0015* (2013.01); *B23D 59/02* (2013.01); *B23Q 11/10* (2013.01); *B24B 7/18* (2013.01); *B25F 5/006* (2013.01); *B25F 5/008* (2013.01); *B27B 17/0033* (2013.01); *B27B 17/08* (2013.01); *B28D 7/02* (2013.01); *H02K 1/2706* (2013.01); *H02K 5/20* (2013.01); *H02K 7/14* (2013.01); *H02K 9/19* (2013.01); *H02P 27/06* (2013.01); *Y10T 83/293* (2015.04)

(58) Field of Classification Search
USPC .............................................. 318/700, 34, 3
See application file for complete search history.

(56) References Cited

U.S. PATENT DOCUMENTS

| | | | |
|---|---|---|---|
| 2,904,709 A | 9/1959 | Lautner | |
| 3,085,603 A | 4/1963 | Stanley | |
| 3,409,056 A | 11/1968 | Rauh | |
| 3,772,784 A | 11/1973 | Heermann | |
| 3,878,414 A | 4/1975 | Harakawa | |
| 4,202,096 A | 5/1980 | Nagashima | |
| 4,219,932 A | 9/1980 | Nagashima et al. | |
| 4,384,321 A | 5/1983 | Rippel | |
| 4,445,056 A | 4/1984 | Gaylord | |
| 4,680,862 A | 7/1987 | Wieland et al. | |
| 4,788,485 A | 11/1988 | Kawagishi et al. | |
| 5,019,733 A | 5/1991 | Kano et al. | |
| 5,856,715 A | 1/1999 | Peot et al. | |
| 5,856,716 A | 1/1999 | Coupart et al. | |
| 5,889,342 A | 3/1999 | Hasebe et al. | |
| 5,939,808 A | 8/1999 | Adames | |
| 5,960,549 A | 10/1999 | Höppner | |
| 6,220,046 B1 | 4/2001 | Kristen et al. | |
| 6,336,273 B1 | 1/2002 | Nilsson et al. | |
| 6,375,171 B1 | 4/2002 | Zimmermann et al. | |
| 6,407,476 B1 | 6/2002 | Nishimura | |
| 6,442,841 B1 | 9/2002 | Nilsson et al. | |
| 6,518,719 B1* | 2/2003 | Suzuki | B24B 23/02 318/430 |
| 6,591,826 B1 | 7/2003 | Donnerdal | |
| 6,868,793 B2 | 3/2005 | Hoffmann et al. | |
| 6,903,471 B2 | 6/2005 | Arimitsu et al. | |
| 7,088,021 B2 | 8/2006 | Kobayashi et al. | |
| 7,597,157 B2 | 10/2009 | Stierle et al. | |
| 7,713,111 B2 | 5/2010 | Layher et al. | |
| 7,816,824 B2 | 10/2010 | Jöckel | |
| 7,942,212 B2 | 5/2011 | Zimmermann | |
| 8,225,514 B2 | 7/2012 | Guip et al. | |
| 2001/0003983 A1 | 6/2001 | Iida et al. | |
| 2002/0007956 A1 | 1/2002 | Bongers-Ambrosius et al. | |
| 2002/0073558 A1 | 6/2002 | Tajima et al. | |
| 2003/0075997 A1 | 4/2003 | Keim et al. | |
| 2005/0034715 A1 | 2/2005 | Terpstra | |
| 2006/0260453 A1 | 11/2006 | Layher et al. | |
| 2011/0227418 A1 | 9/2011 | Pyboyina et al. | |
| 2012/0234305 A1 | 9/2012 | Jönsson | |
| 2015/0151447 A1 | 6/2015 | Petersson et al. | |

FOREIGN PATENT DOCUMENTS

| | | |
|---|---|---|
| CN | 101013836 A | 8/2007 |
| CN | 101951068 A | 1/2011 |
| CN | 201708655 U | 1/2011 |
| CN | 102638133 A | 8/2012 |
| CN | 104582886 A | 4/2015 |
| DE | 4230379 A1 | 3/1994 |
| DE | 4416044 A1 | 11/1995 |
| DE | 29714740 U1 | 10/1997 |
| DE | 19624519 A1 | 1/1998 |
| DE | 102007006986 B3 | 6/2008 |
| DE | 102007035271 A1 | 1/2009 |
| DE | 102008001607 A1 | 11/2009 |
| DE | 102009029716 A1 | 12/2009 |
| DE | 202011000186 U1 | 4/2012 |
| EP | 1115190 A1 | 7/2001 |
| EP | 2461462 A2 | 6/2012 |
| EP | 2858777 A2 | 4/2015 |
| FR | 1496061 A | 9/1967 |
| GB | 1224822 A | 3/1971 |
| GB | 2422129 A | 7/2006 |
| JP | S58-218873 A | 12/1983 |
| JP | S61-141997 U | 9/1986 |
| JP | 2001190047 A | 7/2001 |
| JP | 2001327137 A | 11/2001 |
| JP | 2002051503 A | 2/2002 |
| JP | 2010206994 A | 9/2010 |
| JP | 2015523226 A | 8/2015 |
| SU | 791521 A1 | 12/1980 |
| SU | 954220 A1 | 8/1982 |
| SU | 1007978 A1 | 3/1983 |
| WO | 9955503 A1 | 11/1999 |
| WO | 0005032 A1 | 2/2000 |
| WO | 0247873 A1 | 6/2002 |
| WO | 2006009847 A1 | 1/2006 |
| WO | 2007069946 A1 | 6/2007 |
| WO | 2009108093 A1 | 9/2009 |
| WO | 2011028154 A1 | 3/2011 |
| WO | 2012018027 A1 | 2/2012 |
| WO | 2012039488 A1 | 3/2012 |
| WO | 2012121643 A1 | 9/2012 |
| WO | 2013000704 A2 | 1/2013 |
| WO | 2013187837 A2 | 12/2013 |

OTHER PUBLICATIONS

International Preliminary Report on Patentability for International Application No. PCT/SE2013/050682 dated Sep. 22, 2014.
Second Written Opinion of PCT/SE2013/050682 dated May 28, 2014, all enclosed pages cited.

* cited by examiner

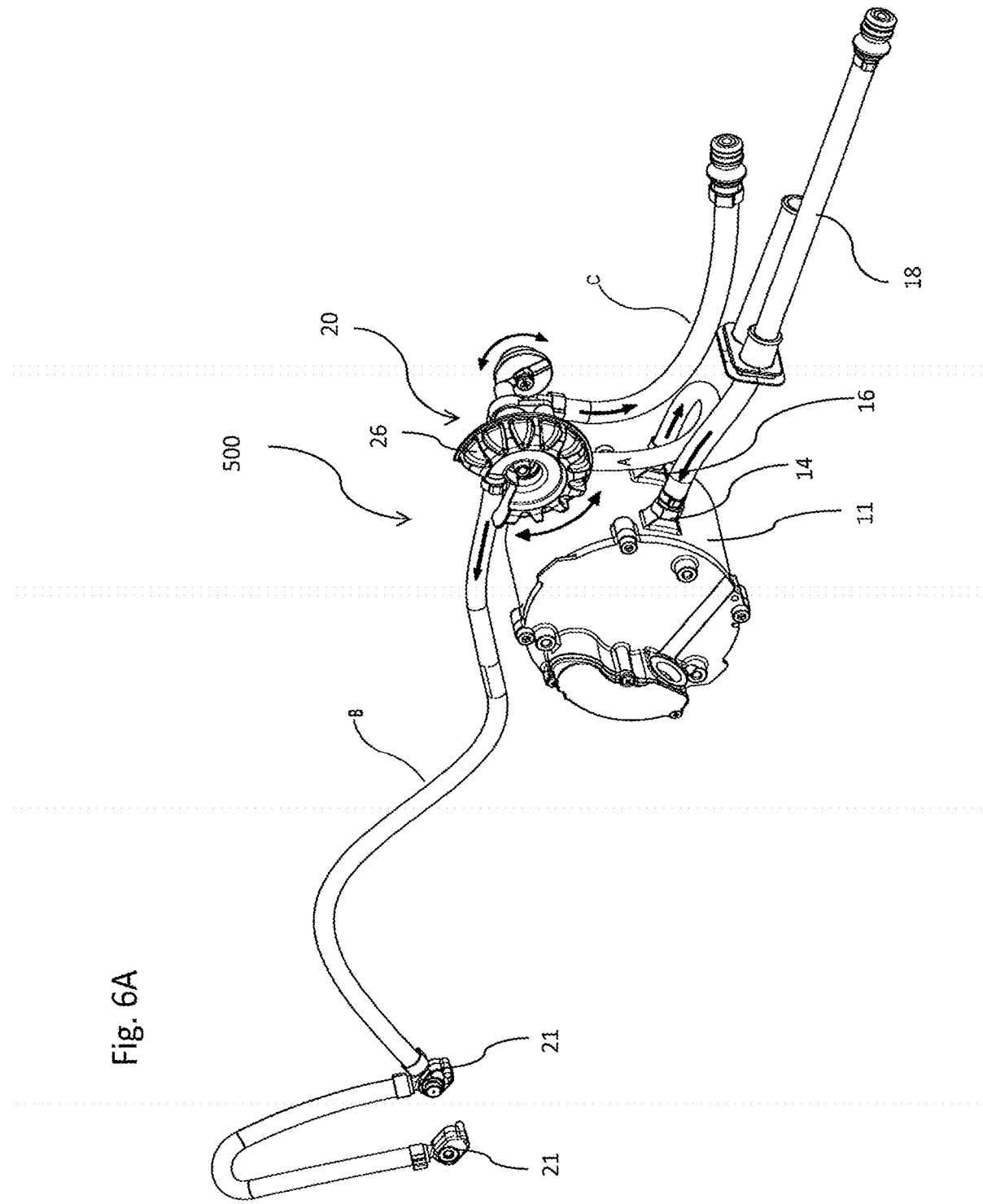

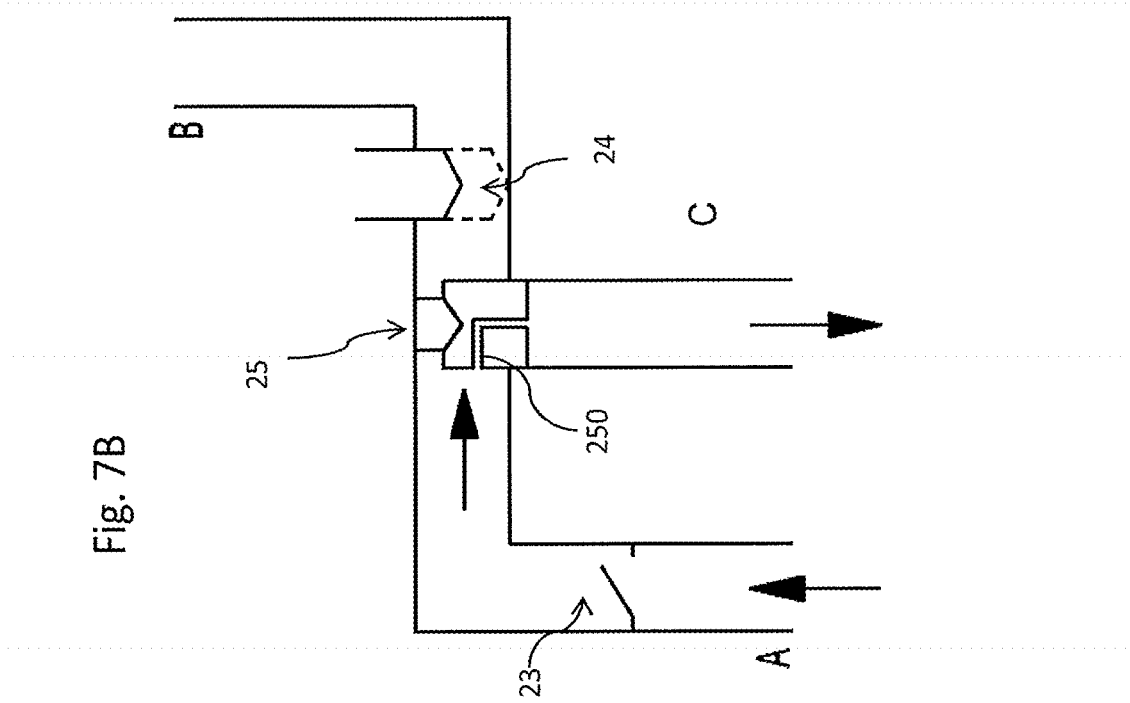
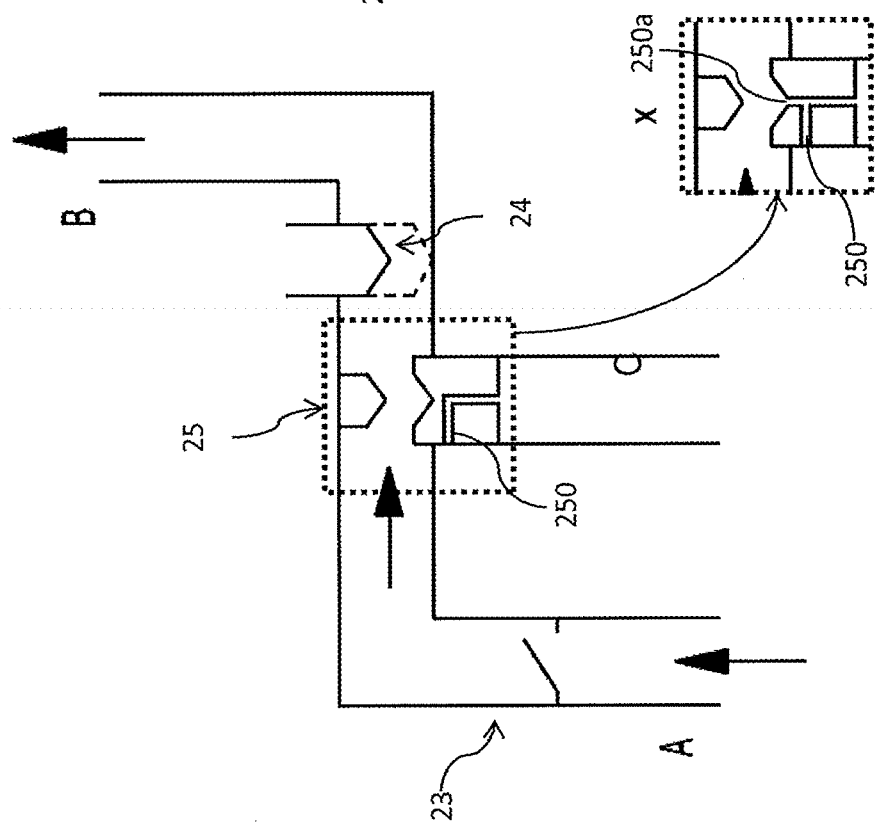
Fig. 7B
Fig. 7A

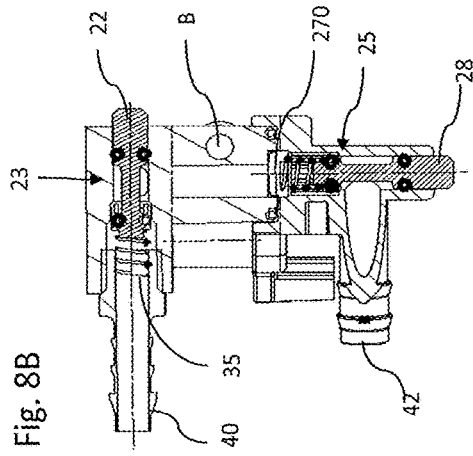
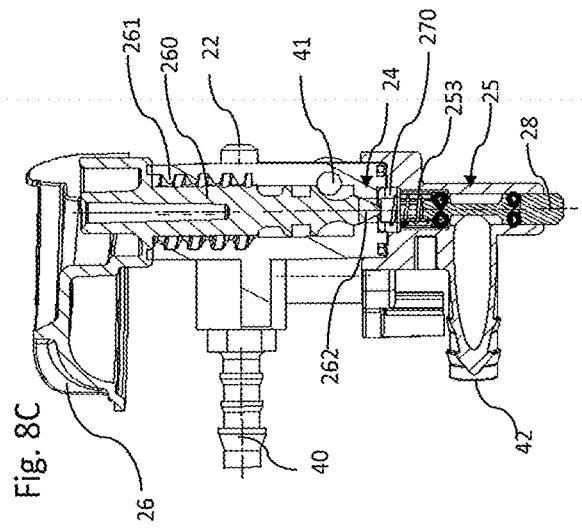
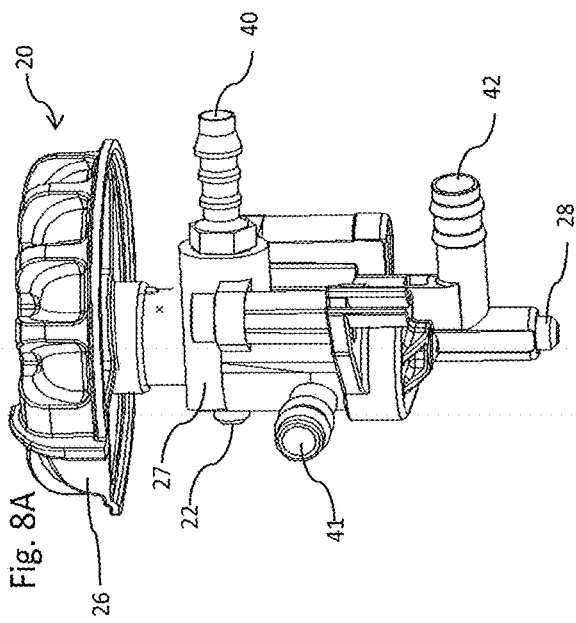

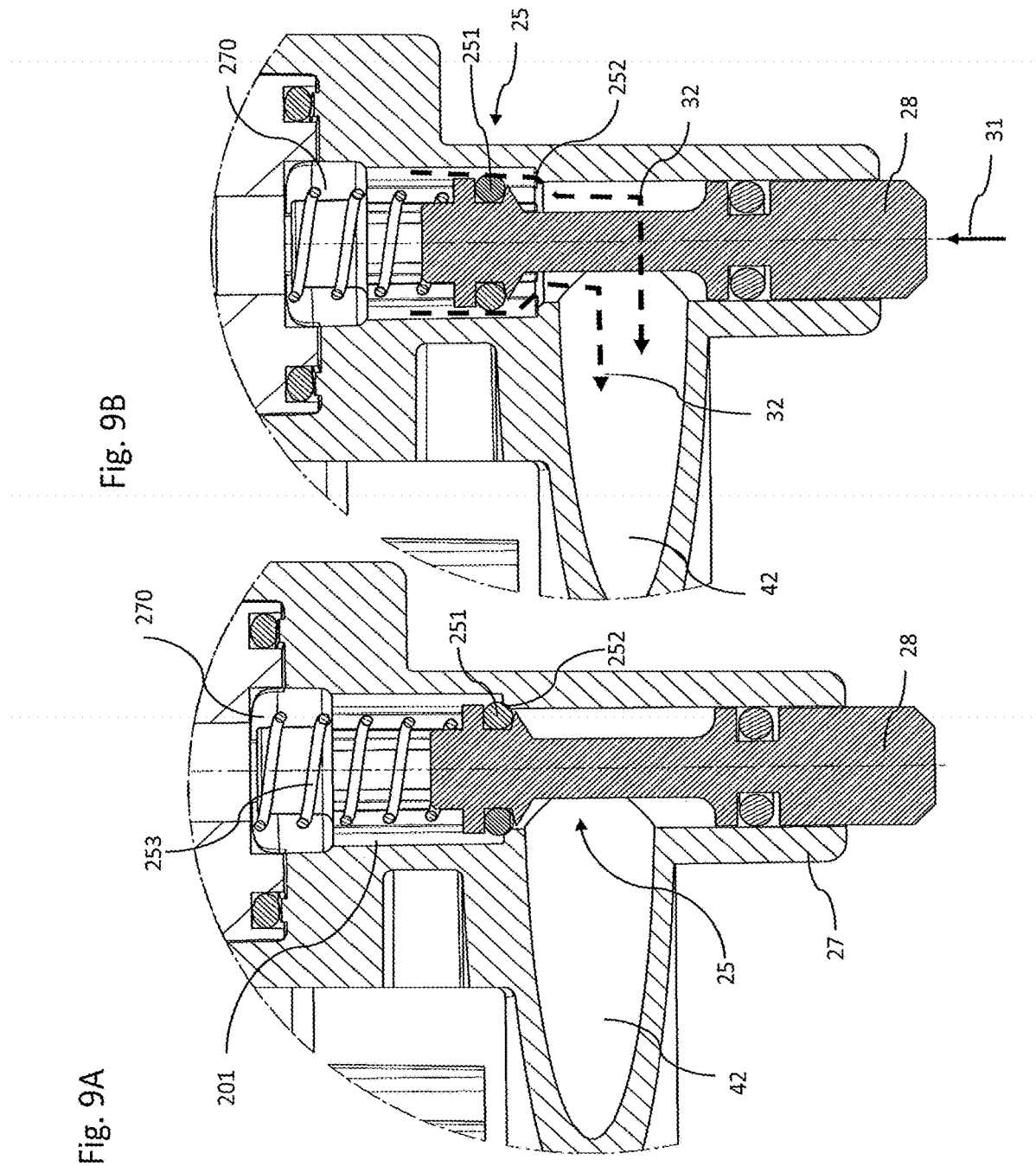

ELECTRIC CUTTING SYSTEM

CROSS REFERENCE TO RELATED APPLICATIONS

This application is a continuation of U.S. application Ser. No. 14/407,534 filed Dec. 12, 2014, which is a national phase entry of PCT/SE2013/050682 filed Jun. 12, 2013, which claims priority to SE 1250614-3 filed Jun. 12, 2012 and SE 1350571-4 filed May 8, 2013. The subject matter of all applications above are hereby incorporated by reference in its entirety.

TECHNICAL FIELD

The invention is related an electric machine system and in particular an electric cutting system at least comprising an electric power cutter which power cutter comprises a rotatable circular saw blade with a protective cover, a rear handle with a switch/speed control and a front handle, a drive unit for rotating the saw blade, the drive unit itself comprising a saw blade drive shaft to which the saw blade is attachable, a transmission for driving the saw blade drive shaft, an electric motor for driving an input shaft of the transmission and a support structure for holding/carrying the saw blade drive shaft.

BACKGROUND ART

Electric power cutters normally have a front and a rear handle each firmly attached to a drive unit including an electric motor. This results in that a lot of vibrations from the rotating tool and possibly the motor reach the handles and the operator. In many countries daily operating times are reduced by regulations according to the measured vibration level in the handle. It is known to attach one or both handles somewhat flexible with rubber bushings. This does reduce vibration levels to a certain degree, but has a limited effectiveness.

Electric tools, of which many are hand-held, must meet many requirements. They must be powerful and durable, yet remain easy to handle. A few of these tools are equipped with a high frequency brushless asynchronous or synchronous motor which exhibits a speed-torque characteristic that differs from ordinary AC motors tools. The speed of an asynchronous or synchronous motor at light loads is proportional to the frequency which also can be controlled to keep its speed relatively constant regardless of load conditions.

These motors are also known as brushless DC (BLDC) motors, and are generally reliable. Normally, they require a power supply device or a power converter, converting the mains frequency to the motor frequency, which often is higher than the mains frequency. The power converter is also called frequency converter.

The power supply device provides a suitable voltage and frequency to the tool, where the rotational speed of the motor is determined by the frequency of the supplied power. Such a power converter normally converts a mains input of, for example 3×400 V AC, 50 Hz, to a three-phase supply of 3×300 VAC, where the frequency is adjustable.

The power supply device or power converter is normally divided into two parts an input rectifier and an output inverter. If instead the BLDC motor would be run from a DC source, e.g. a battery, no input rectifier would be needed.

The input rectifier converts the incoming AC input voltage to a DC output voltage, often called DC bus voltage.

The output inverter converts the DC bus voltage to three-phase voltages to the BLDC motor.

It is desirable for a tool with a BLDC motor to be able to operate over a broad range of AC mains voltages, e.g., from 3×180 VAC, 50/60 Hz, for the Japanese market and nominally 3×400 VAC, 50 Hz, for the European market. To achieve this, a power supply device according to the above is generally adopted to provide the same DC output voltage irrespective of the AC input. The common solution for this is to insert a converter assembly or voltage booster between the input rectifier and the output inverter. The power supply device will then consist of the following parts: Input rectifier, converter assembly or voltage booster and output inverter. An example of this is described in, for example, WO 2006009847.

The converter assembly or voltage booster converts (boosts) the incoming DC voltage to the output DC bus voltage, such that the output DC bus voltage normally is higher than, or the same as, the DC input voltage. Often the output DC bus voltage is a constant DC voltage, regardless of the input AC voltage.

However, there is still a need for an enhanced power supply device or power converter, that may provide sufficient output power with smaller and less expensive components than those disclosed in the prior art.

SUMMARY OF THE INVENTION

It is an object of the present invention to provide a power supply device, that may provide sufficient output power with smaller and less expensive components than those disclosed in the prior art.

It is an object of the invention to provide an improved electric cutter system which reduces vibrations in the handle unit from the cutter assembly during use. It is another purpose of the invention to provide an electric cutter system which prevent scattering of dust when sawing in materials which have a tendency to generate dust. It is yet another purpose of the invention to provide an electric cutter system which has an efficient cooling system for cooling the electric motor.

According to the invention there is provided an electric power saw/cutter. Hereby is achieved an electric power cutter where vibrations which unavoidably will be generated in the saw blade during sawing operation will be essentially reduced in the handle unit which is a significant advantage for the operator of the cutter. Not only will this reduce vibration-related health issues for users who for example run cutting machines frequently and during extended time periods, it will also lead to that an operator may comfortably use the machine for longer time periods without risk being subjected to undesired vibration levels.

Further aspects of the cutting assembly, the cover device, the sealing body, and the working machine, are apparent from the accompanying patent claims and from the following description of preferred embodiments of said devices. It shall be understood that terms like upwards and downwards, upper surface, and bottom surface, respectively etc. refer to a cutting assembly with a cover device placed on a horizontal support. Further, the terms front and rear end mean the front end which is turned in the direction in which one normally will work with the machine, and the rear end, respectively, which rear end is positioned in the same end as the terminal member. The terms have been chosen in order to facilitate the understanding of the description and does in no way exclude working ceilings, vertical walls, etc.

BRIEF DESCRIPTION OF THE DRAWINGS

In the following detailed description of the invention, reference will be made to the accompanying drawings, in which:

FIGS. 6A-B show a cooling fluid system according to one embodiment of the invention.

FIGS. 7A-D show examples of distribution of cooling fluid through the cooling fluid system.

FIGS. 8A-C show a control unit for cooling fluid according to one embodiment of the invention.

FIGS. 9A-B show detailed view of the control unit seen in FIGS. 8A-C.

DETAILED DESCRIPTION

Figure 1:
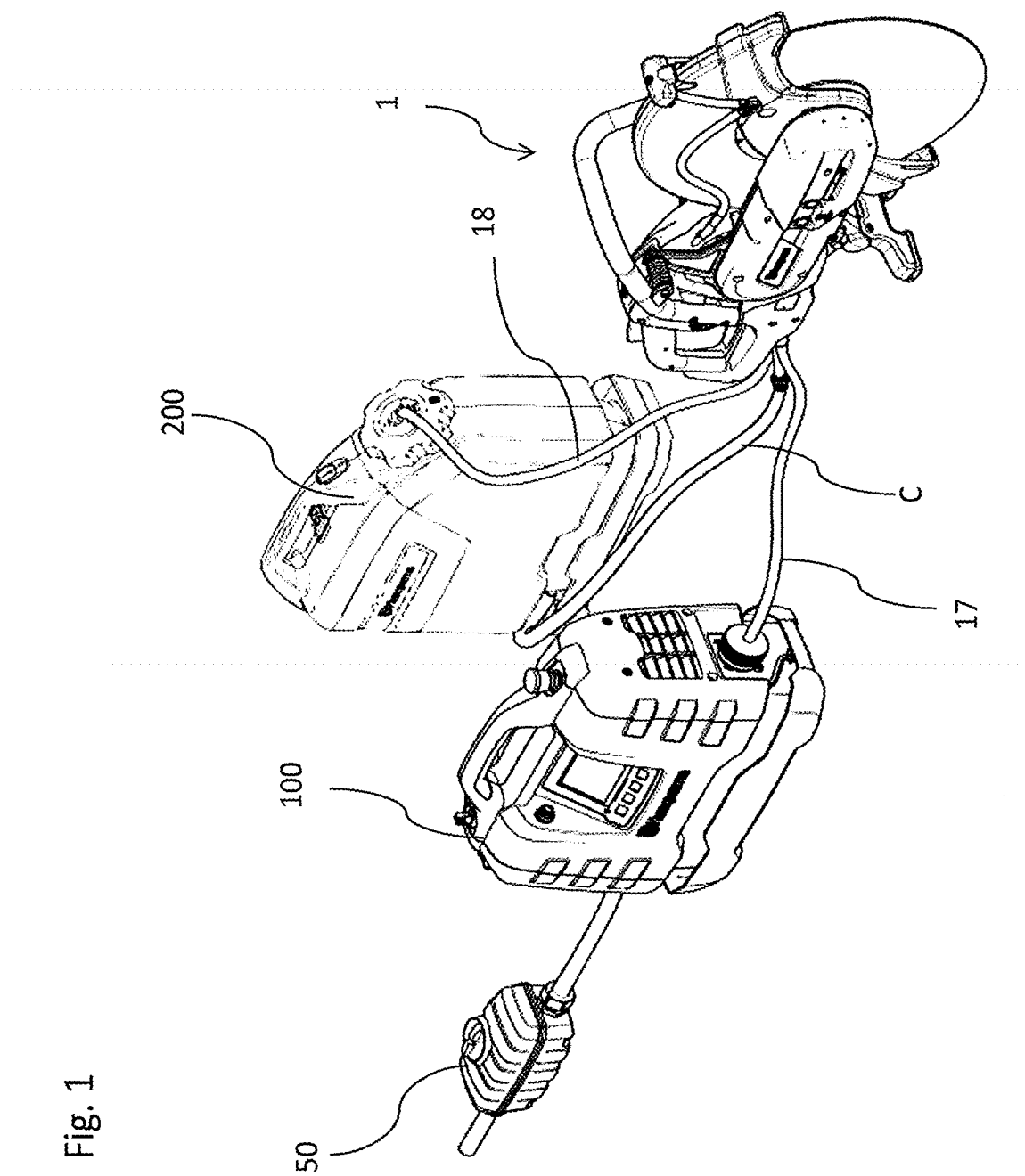
FIG. 1 shows a schematic overview of an electric cutter system according to one embodiment of the invention.
Figure 2:
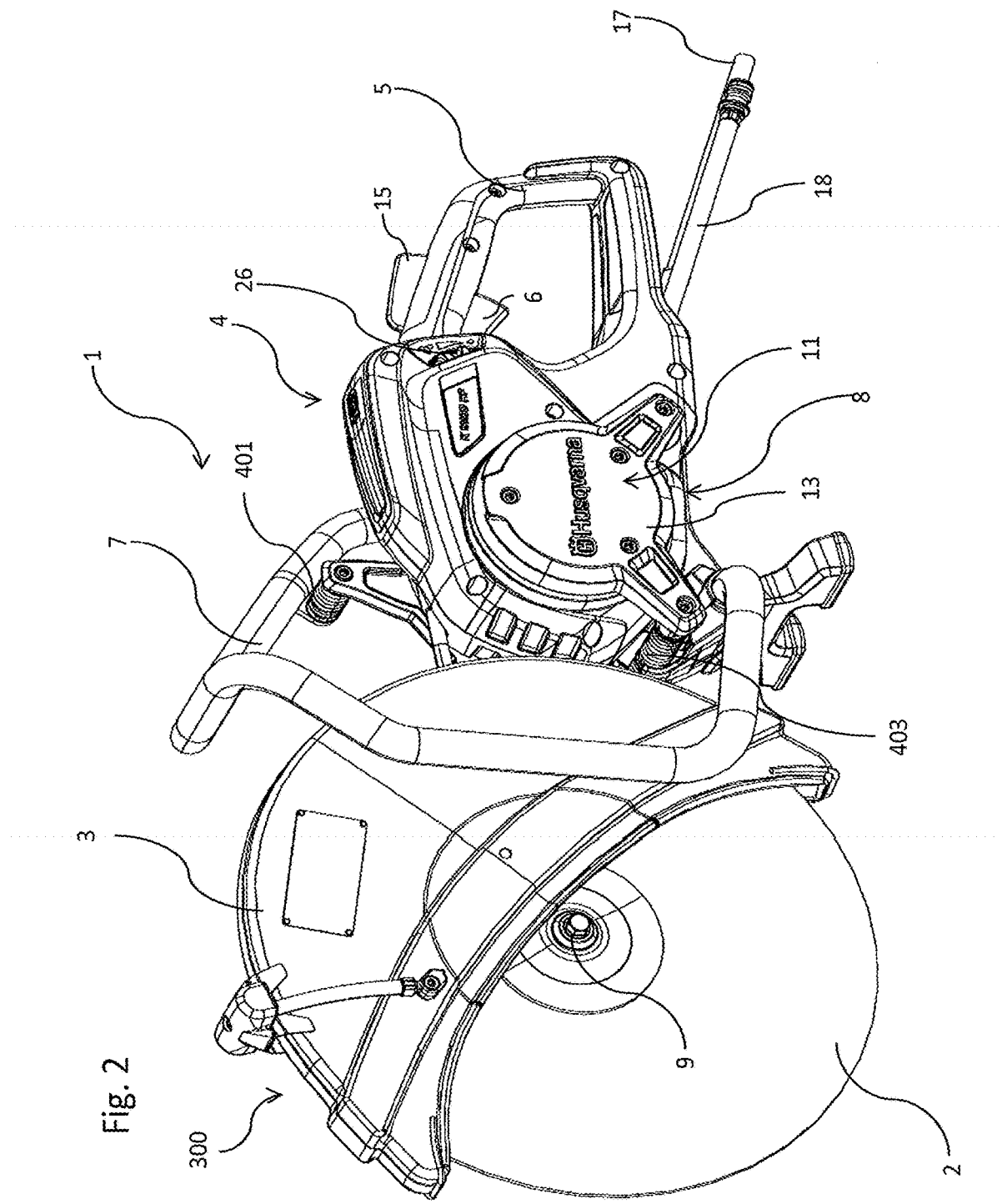
FIG. 2 is a perspective view showing the power cutter according to one embodiment.
Figure 3:
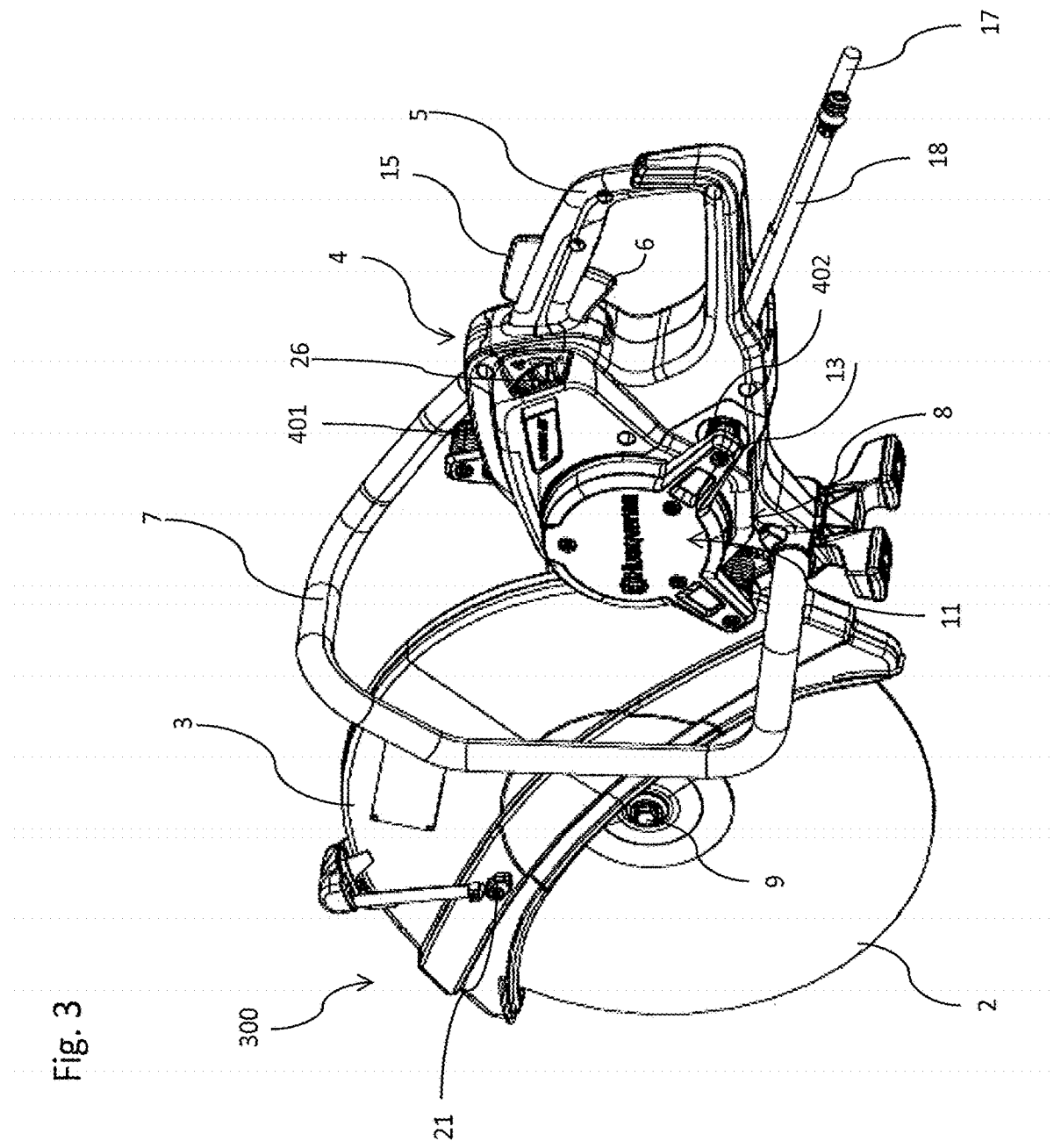
FIG. 3 is another perspective view showing the power cutter of FIG. 2.
Figure 4:
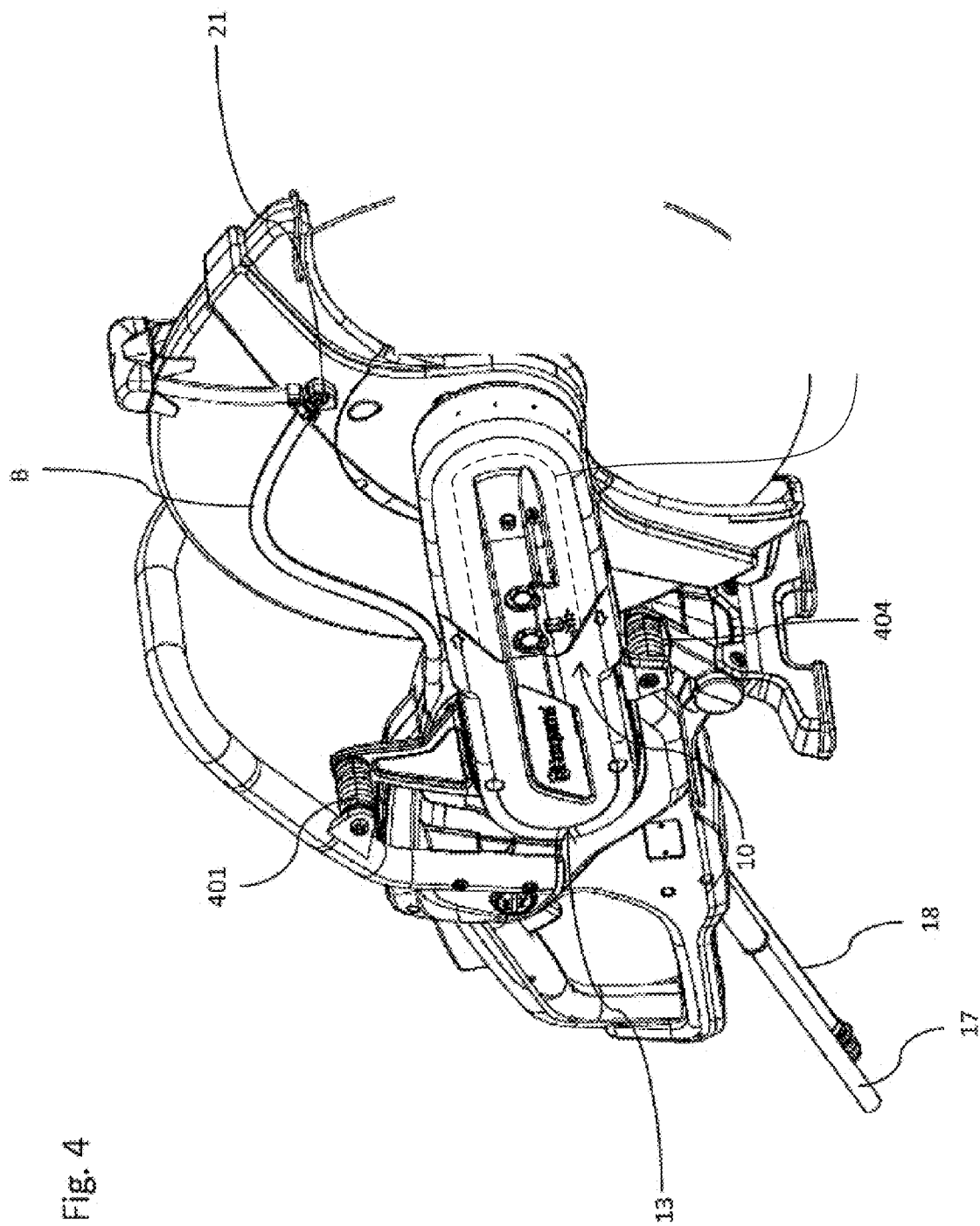
FIG. 4 is a perspective view showing the power cutter from the opposite side compared to FIG. 3.
Figure 5:
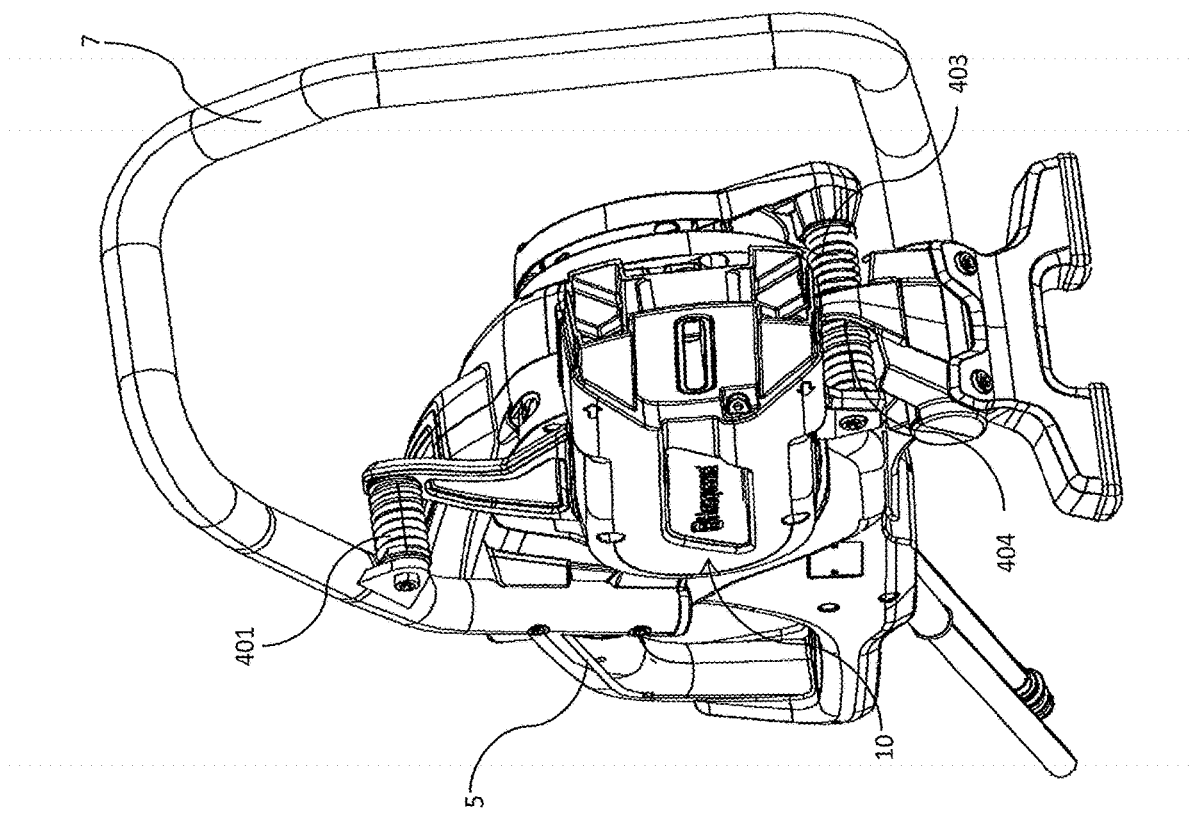
FIG. 5 is a perspective view of the power cutter shown without its saw blade.

FIG. 1 shows an electric tool in the form of an electric power cutter 1, an electric power supply device 100, and a fluid source 200 in the form a water tank. The electric power supply device 100 supplies power through a cable 17 to the electric power cutter 1. It may also send data and receive feedback data from the electric cutter 1 via the cable 17. The electric power supply device 100 connects to a power grid or a generator via a residual current device 50. The electric power supply device 100 is described in more detail in relation to FIGS. 12-19. Cooling liquid, preferably cooling water, is fed from the fluid source 200 to the electric power cutter 1 through hose 18.

The fluid source 200 is preferably a water tank with a low pressure pump, i.e. having a feeding pressure below 3 bar, preferably below 2 bar, feeding cooling water to the motor 11 (see e.g. FIGS. 2-5) of the electric power cutter 1 through hose 18.

A return conduit C may be connected to the motor 11 (see e.g. FIGS. 2-5) of the electric power cutter for return of the cooling water to the fluid source 200 in order to recirculate cooling water.

With reference now to FIGS. 2-5, the electric power cutter 1 according to the invention is generally designated 1 (the electric tool is designated 106 when referred to in relation to FIG. 12-19) and is shown from various perspective views. Its main parts comprise a cutter assembly 300, a drive unit 8 and a handle unit 4.

According to one embodiment the cutter assembly 300 includes a rotatable circular saw structure, such as a saw blade 2, and preferably a protective cover 3.

The drive unit 8 is arranged to rotate the saw blade 2, and comprises a saw structure drive arrangement 9 (e.g. a saw blade drive shaft 9) to which the saw blade 2 is attachable, transmission 10 for driving the saw blade drive shaft 9, and a transmission drive source in the form of an electric motor 11 (the motor is designated 136 when referred to in relation to FIG. 12-19) for driving an input shaft 12 of the transmission 10. The drive unit 8 further includes a support structure 13 for holding/carrying the saw blade drive shaft 9, the transmission 10 and the electric motor 11.

The transmission 10 may for instance be a gear train transmission, a chain transmission, or a belt transmission. However the preferred transmission is a belt transmission. The belt transmission provides some slip if blade jams, i.e. overload prevention and it is also quieter compared to other transmission solutions. The (input shaft 12)/(drive shaft 9) gear ratio is preferably within the range of 1:1 to 3:1, typically around 2:1.

The handle unit 4 includes a front handle 7 for carrying the saw and a rear handle 5 for operating the saw. In one embodiment the handle unit 4 comprises a cavity which houses the support structure 13 of the drive unit 8 in such a way that the motor 11 is essentially enclosed by the handle unit 4. This is seen e.g. in FIGS. 2-3 where the motor 11 is substantially covered by and therefore hidden behind the support structure 13.

The rear handle 5 is provided with a speed control trigger 6 for the drive unit 8 and a trigger lock 15. The trigger lock 15 has to be pressed down to permit the speed control trigger 6 to move, thereby preventing an inadvertent activation of the motor 11. In a preferred embodiment the trigger lock 15 also functions as a cooling water supply control in that the trigger lock 15, in addition to activating the speed control trigger 6, also activates a fluid control unit 20 upon being pressed down by an operator, meaning that an operator will activate both of said speed control trigger 6 and the fluid control unit 20 (see FIG. 6B) in the same grip around the rear handle 5. Thereby cooling water is enabled only when the electric motor 11 is running. The fluid control unit 20 is further explained in FIG. 6B.

The electric power cutter 1 is connected to a fluid supply for cooling the electric motor 11 and/or supplying fluid to the cutter assembly 300. In a preferred embodiment the fluid is water. Supplying water to the cutter assembly 300 provides cooling of the saw blade 2, and also contributes to prevent scattering of dust generated during working operation: water which is successively sprayed onto the saw blade 2, during use of the power cutter, binds the dust and thereby prevents it from being spread to ambient air.

Cooling water is fed to the electric power cutter 1 via hose 18 which is connected to a fluid source 200 (see FIG. 1) e.g. to a water supply network or to a water tank.

The cooling fluid system is generally designated 500, and will now be further described with reference mainly to FIGS. 6-8 showing an overview of a cooling water system 500 in accordance with an embodiment of the invention.

FIG. 6A is an overview of a cooling fluid system 500 arranged to be coupled to an electric power cutter 1 according to the invention, and to supply cooling fluid (e.g. water) to the motor 11 for cooling and to the cutter assembly 300 for cooling/preventing scattering of dust. The cooling fluid system 500 comprises supply hose 18 which leads the cooling fluid (hereinafter also referred to as cooling water and/or cooling liquid) to a motor inlet 14 for cooling liquid. Further the water cooling system 500 comprises a fluid control unit 20, a transfer conduit A, a tool conduit B and a return conduit C.

As already mentioned, water is supplied to the electric cutter 1 by coupling the supply hose 18 to a fluid source 200 e.g. a water tank or to a water supply network. Water is run through the hose 18 via said motor inlet 14 into the motor 11 for cooling. After having passed through the motor 11 the cooling water exits through a motor outlet 16 and is transferred via transfer conduit A to the fluid control unit 20 which regulates further distribution of the water. By means of manipulating the fluid control unit 20 water may be guided into tool conduit B for exit through at least one saw blade nozzle 21 or into return conduit C for return of water e.g. to said fluid source 200 or for discarding. The total amount of fluid passing through the system 500, however, will always first pass through the motor 11 before being transferred to the tool conduit B or to the return conduit C. In one embodiment it is also possible to completely seal off/close the fluid control unit 20 so that no water will pass, neither to the tool conduit B nor to the return conduit C, as will later be described in more detail.

Figure 6B:
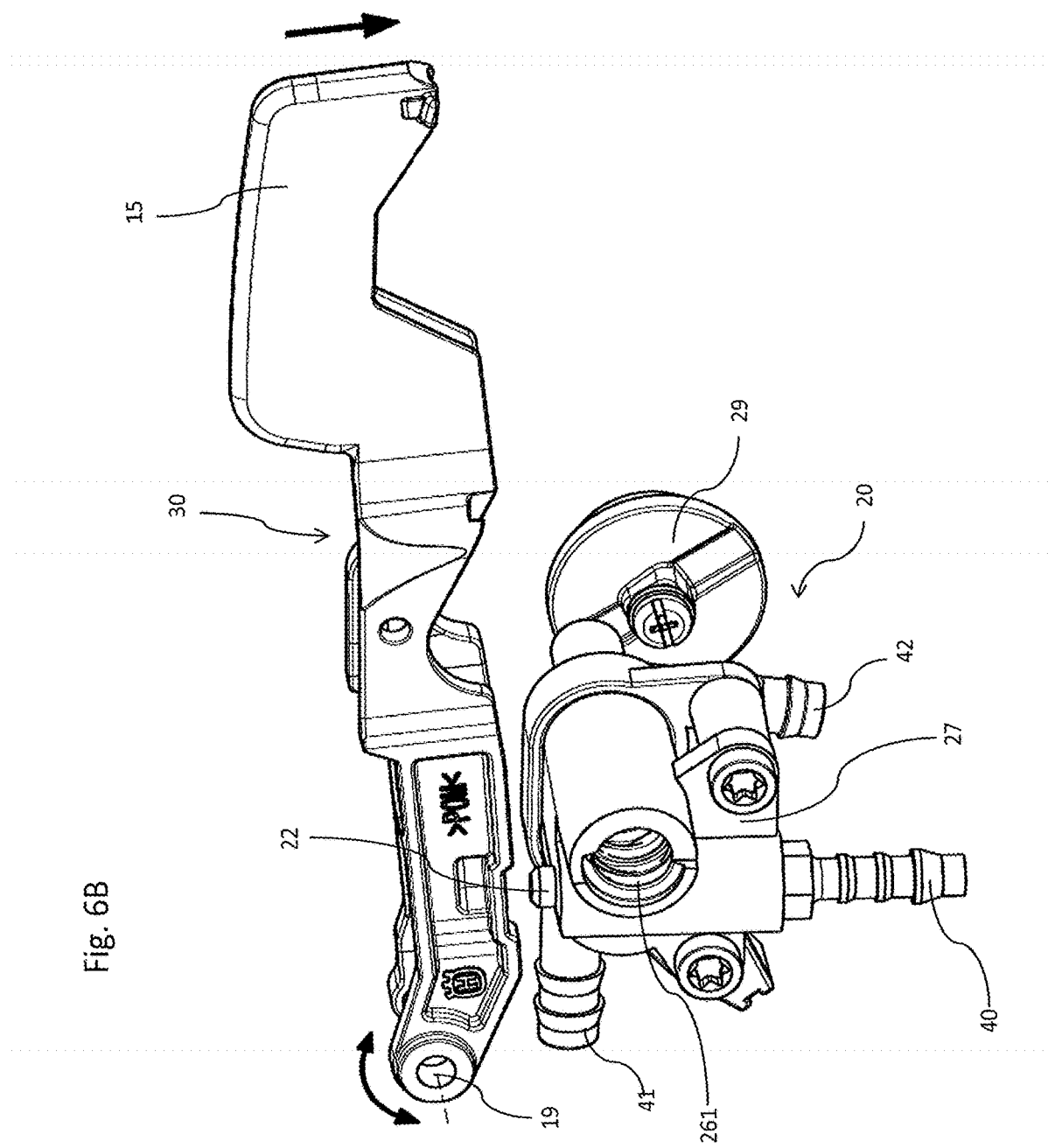

FIG. 6B illustrates the function of said trigger lock 15 arranged to activate supply of cooling liquid through the motor 11. The trigger lock 15 is the distal end of a lever arm 30 pivotably secured at its proximal end 19 to the handle unit 4, and protruding from the rear handle 5 as seen e.g. in FIG. 2 and being located opposite to the sped control trigger 6 so that an operator with one hand can push the trigger lock 15 and operate the speed control trigger 6. The lever arm 30 is spring biased so that when released it returns to a position locking the speed control trigger 6 and deactivating the fluid control unit 20. When pressing the trigger lock 15 towards the rear handle 5, the lever 30 moves downwards in a pivoting movement. The downward movement of the lever arm 30 leads to that it will engage a closure member 22 of an inlet valve 23 of the fluid control unit 20 in such a way that pushing down the closure member 22 opens the inlet valve 23 and permits water to flow from the transfer conduit A into the fluid control unit 20. Obviously, when water runs through the fluid control unit 20; water flows through the motor 11.

Figure 7D:
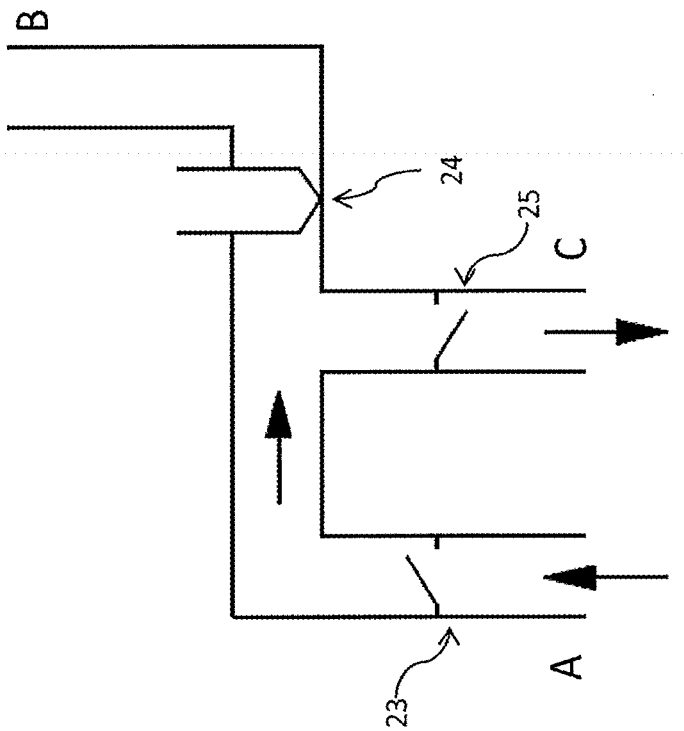
Figure 7C:
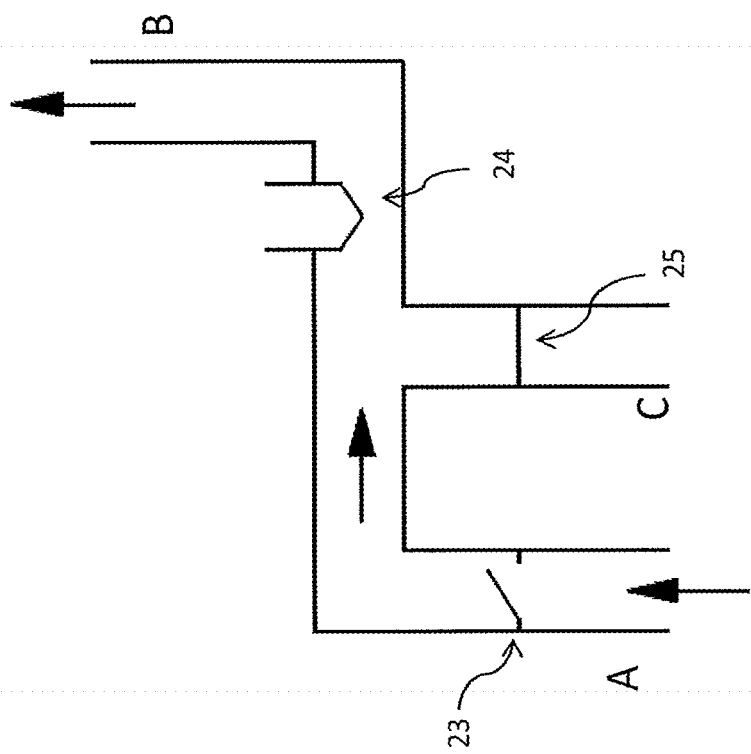

Distribution routes of cooling liquid via the fluid control unit 20 are described in the schematic illustrations of FIGS. 7A-D showing different ways of guiding the incoming water from the transfer conduit A. FIGS. 7A-B show one example of arranging a control unit 20 according to the invention and FIGS. 7C-D show another example.

Each of FIG. 7A-D displays transfer conduit A, tool conduit B and return conduit C, as well as valves 23, 24, 25 arranged in the fluid control unit 20 by means of which water distribution can be manipulated. Said valves includes a first 23 valve (also referred to as inlet valve 23), a second valve 24 (also referred to as tool conduit valve 24) and a third valve 25 (also referred to as return conduit valve 25).

FIGS. 7A-B show one example of arranging the valves 23, 24, 25 of the fluid control unit 20. According to this embodiment the fluid supply to the blade 2 is independent of the fluid return to return conduit C, i.e. regulation of the flow to the blade not affected by opening/closing the return valve 25. FIG. 7A illustrates a configuration wherein all the fluid passing the system is guided to the tool conduit B by means of open first 23 and second 24 valves and closed third valve 25. In FIG. 7B there is illustrated a configuration where all the fluid passing the system is guided to the return conduit C by means of open first 23 and third 25 valves and closed second valve 24.

The valve arrangement shown in FIGS. 7A-B means that fluid may be supplied both to the tool conduit B and to the return conduit C at the same time, i.e. by opening both of the respective second 24 and third 25 valves.

FIG. 7C illustrates a situation where the inlet valve 23 is open and the fluid control unit 20 set to allow water supply only to the tool conduit B by opening the tool conduit valve 24 and closing the return conduit valve 25. The return conduit valve 25 could however be provided with a through channel 250, as shown in FIG. 7A, arranged to allow for passage of a predetermined volume of water and by blocking the through channel 250 the return conduit valve 25 is closed. In one embodiment such volume corresponds to a flow rate between 0.3-0.7 Lit/min, preferably 0.4-0.6 Lit/min. As an example, if said flow rate equals 0.5 Lit/min and water is supplied from a tank comprising 15 Lit, the time to circulate the entire amount of the water from said tank through the cooling fluid system 500 once would equal 30 minutes.

In the shown embodiment the tool conduit valve 24 can be gradually opened/closed meaning that the amount of water which is supplied to the blade 2 can be adjusted by opening/closing the tool conduit valve 24 to various degrees. Regulation of water to the blade 2 also affects the volume of cooling water passing through the motor 11: maximum opening of the second valve 24 leads to maximum cooling of the motor and vice versa. The valves 23, 24, 25 of the fluid control unit 20 can preferably be opened/closed independently of each other, meaning that for instance in FIG. 7C the tool conduit valve 24 can be closed (as shown in dashed lines) to completely stop water from passing through the fluid control unit 20 regardless of whether the inlet valve 23 is open or closed. Closing of both second 24 and third 25 valves leads to working operation with dry cutting blade 2 and no cooling of the motor 11 (i.e. stopped flow of cooling liquid) since liquid is prevented from passing through the fluid control unit 20.

FIG. 7D illustrates a situation where both the first inlet valve 23 and the third return conduit valve 25 are open, meaning the fluid control unit 20 is set to allow water supply only to the return conduit C and not to the blade. In one embodiment the return conduit valve 25 is an on/off valve meaning it can either be set at a fully open or a closed mode.

As shown in FIGS. 7A-B opening of the third valve 25 simultaneously leads to sealing of the passage to the tool conduit B, meaning that flow of water to the return conduit C also leads to that the water supply to the tool conduit B is shut off. Opening of the third valve 25, as in FIG. 7D, thus leads to working operation with a dry cutting blade 2 and cooling of the motor 11 by means of liquid running through the motor 11 via the transfer conduit A and further passing the first 23 and third 25 valves into the return conduit C. Thus by opening the return conduit valve 25 an operator may shut off water supply to the blade and still keep cooling fluid running through the motor 11 in just one movement (i.e. switch open the return conduit valve 25).

By optionally having a channel 250a, as shown by the dotted box X, a minimum flow through the fluid control unit 20 can be guaranteed as longs as the inlet valve 23 is open.

The fluid control unit 20 according to one embodiment of the invention is shown in more detail in FIGS. 8A-C, where FIG. 8A is a perspective view of the fluid control unit 20 and FIGS. 8B and 8C show various cross sections intended to illustrate the fluid control unit 20. The valves of the fluid control unit 20 shown in FIGS. 8A-C are arranged as schematically illustrated in FIGS. 7A-B. The position of the fluid control unit 20 in the cooling fluid system 500 is seen in FIG. 6A, and FIG. 6B shows the position of the fluid control unit body 27 in relation to the lever arm 30.

The fluid control unit 20 comprises body 27 housing a first inlet valve 23. a second tool conduit valve 24 and a third return conduit valve 25. Preferably both the inlet valve 23 and the return conduit valve 25 are on/off valves and are based on the same type of valve mechanism (the return conduit valve 25 is described e.g. in FIG. 9A-B) and preferably the tool conduit valve 24 is a gradually adjustable restriction valve. Fluid is supplied to the fluid control unit 20 through the transfer conduit A which is connected to an inlet port 40 leading to the inlet valve 23. Fluid can exit the fluid control unit 20 through the tool conduit valve 24 leading to a tool conduit port 41 which is connected to the tool conduit B, and/or through the return conduit valve 25 leading to a return conduit port 42 which is connected to the return conduit C. Fluid flowing through tool conduit B will finally exit through the saw blade nozzles 21 onto the blade 2 cooling the blade 2 as well as reducing dust in the air by wetting it. Fluid flowing through return conduit C could be discarded or be returned to the fluid source 200 for recycling. For instance the fluid source 200 could be a bucket from which water is pumped to flow through the system.

The inlet valve 23 includes an inlet valve closure member 22 which can move between an open and closed position. A spring 35 urges the inlet valve closure member 22 to a closed position. In the closed position one end of the inlet valve closure member 22 protrudes from the body 27 and by pushing the protruding end of the inlet valve closure member 22 in a direction towards the body 27 the inlet valve closure member 22 can be moved to a position opening the inlet valve 23. Upon releasing the pressure of the protruding end, the inlet valve closure member 22 is urged by the spring 35 in the opposite direction closing the inlet valve 23.

Activation of the cooling water supply is accomplished by pressing down the trigger lock 15 so that the lever arm 30 presses the protruding end of the inlet valve closure member 22 thereby opening the first inlet valve 23 of the fluid control unit 20. Once the first valve 23 is open water is guided via inner channels (not shown) through the body 27 until it reaches an inner chamber 270 inside the body 27. The inner chamber 270 is arranged with two exits/outlets whereof one leads to the tool conduit valve 24 and the other to the return conduit valve 25, for exiting fluid through the tool conduit port 41 and/or return conduit port 42.

If the return conduit valve 25 is set to open mode water may exit the inner chamber 270 and pass the return conduit valve 25 into the return conduit C. In the shown embodiment the return conduit valve 25 is of the same type as the inlet valve 22, having a return conduit valve closure member 28 which can move between an open and closed position.

A spring 253 urges the return conduit valve closure member 28 to a closed position. The return conduit valve closure member 28 is controlled by a switch 29 (see e.g. FIG. 6B) that can be turned between two positions, a first position pressing a protruding end of the return conduit valve closure member 28 towards the body 27 thereby moving the return conduit valve closure member 28 to a closed position, and a second position releasing pressure on the protruding end allowing the spring 253 to move the return conduit valve closure member 28 to a closed position. The mechanism of opening/closing of the return conduit valve 25 is further clarified in FIGS. 9A-B.

Opening/closing of the tool conduit valve 24 is achieved by manipulating a water control knob 26 to increase or decrease the passage area through the valve 24 thereby being able to gradually adjust the amount of water running through the valve passage and into the tool conduit B via the tool conduit port 41 to finally exit through the saw blade nozzles 21 onto the blade 2. The knob 26 comprises an elongated portion 260 provided with outer threads, which elongated portion 260 is intended to be inserted into a matching opening 261 (see also FIG. 6B) in the body 27 of the fluid control unit 20, said opening 261 comprising inner threads matching the outer threads of said elongated portion 260. In FIG. 8C there is seen the knob 26 positioned with its elongated portion inside said opening 261. The cone-shaped outermost end 262 of the elongated portion 260 is arranged at the outlet of said inner chamber 270 leading to the tool conduit port 41. The cone-shaped portion of the outermost end 262 is arranged inside the outlet creating a restriction passage which can be adjusted to allow for passage of more or less fluid by displacing the elongated portion 260, which is achieved by manipulating the knob 26.

When turning the knob 26 the outer threads of the elongated portion 260 will interact with the inner threads of the opening 261 so that the elongated portion is displaced in the opening 261. To close the tool conduit valve 24 the knob 26 is turned to such a position that said outermost cone-shaped end 262 tightly seals the outlet of the inner chamber 270, thereby blocking any water from passing into the tool conduit B. In a corresponding way the tool conduit valve 24 is opened by means of turning the knob 26 to displace the elongated portion 260 to open the outlet thereby allowing fluid to exit the inner chamber 270 and enter the tool conduit B via the tool conduit port 41. The amount of water which may exit the chamber 270 can be adjusted by controlling the position of the cone-shaped end portion 262 in relation to the outlet: the closer the cone-shaped end portion 262 is brought to a sealed position the less fluid will be able to pass and vice versa.

If the tool conduit valve 24 as well as the return conduit valve 25 are in closed mode water is prevented from passing the fluid control unit 20 and no cooling liquid will flow through the motor 11.

FIGS. 9A-B show detailed views of a fluid control unit 20 in cross section, illustrating the function of a return conduit valve 25 according to the embodiment of FIGS. 8A-C. FIG. 9A shows the return conduit valve 25 in closed mode and FIG. 9B shows the return conduit valve 25 in an open mode. The skilled person understands that the solution described in FIGS. 9A-B represents one of many possibilities of acquiring the desired valve function.

The return conduit valve 25 comprises a spring biased closure member 28 arranged with a sealing member 251, such as a sealing ring 251. When the valve 25 is in a closed mode (FIG. 9A) the spring 253 acts on the closure member 28 so that the sealing member 251 sealingly abuts an inner flange 252 preventing passage of fluid. Activating the return valve (e.g. by means of said switch 29) is achieved by pushing the closure member 28 inwards as indicated with arrow 31 seen in FIG. 9B, overcoming the pressure from the spring 253. The closure member 28 is kept in the activated position for instance by means of letting said switch 29 (e.g. shown in FIG. 6B) block the closure member 28 so that it remains in the corresponding activated position. In an activated position the sealing member 251 has been displaced upwards so that a gap is created between the closure member 28 and the inner flange 252 allowing for passage of fluid into the return conduit C via the return conduit port 42. The flow through the open return conduit valve 25 is indicated with arrows 32 in FIG. 9B.

The electric power cutter 1 further comprises an anti-vibration handle system 400. The handle unit 4 is resiliently connected to the drive unit 8 via said anti-vibration handle system 400 so that vibrations from the saw blade 2 and drive unit 8 will be reduced in the handle unit 4. Essentially all vibrations will come from the saw blade 2 since the power source is an electric motor 11. Said anti-vibration handle system 400 includes a number of vibration damping elements, preferably at least three vibration damping elements 401, 402, 403, 404 arranged in between the handle unit 4 and the support structure 13 of the drive unit 8. An uppermost first vibration element 401 is connected to the front handle 7 vertically above the motor 11.

Longitudinally the first vibration element 401 is located in between a forward most vibration element/s 403, 404 and a rearward most vibration element 402. Both the forward most vibration element/s 403, 404 and the rearward most vibration element 402 are located vertically below the motor 11, forming a triangle seen from a side perspective. The rearward most vibration element 402 is connected to the rear handle 5 behind the motor 11 whereas the forward most vibration element/s 403, 404 are connected in front of the motor 11 but rearward the saw blade 2. The forward most vibration element/s 403, 404 are two vibration elements connecting from a first lateral side of the support structure 13, respective second lateral side of the support structure 13 to a same position on the handle unit 4 laterally in-between. In a preferred embodiment said vibration damping elements are in the form of resilient coil springs, however also other types of damping elements are conceivable such as rubber elements.

Figure 10:
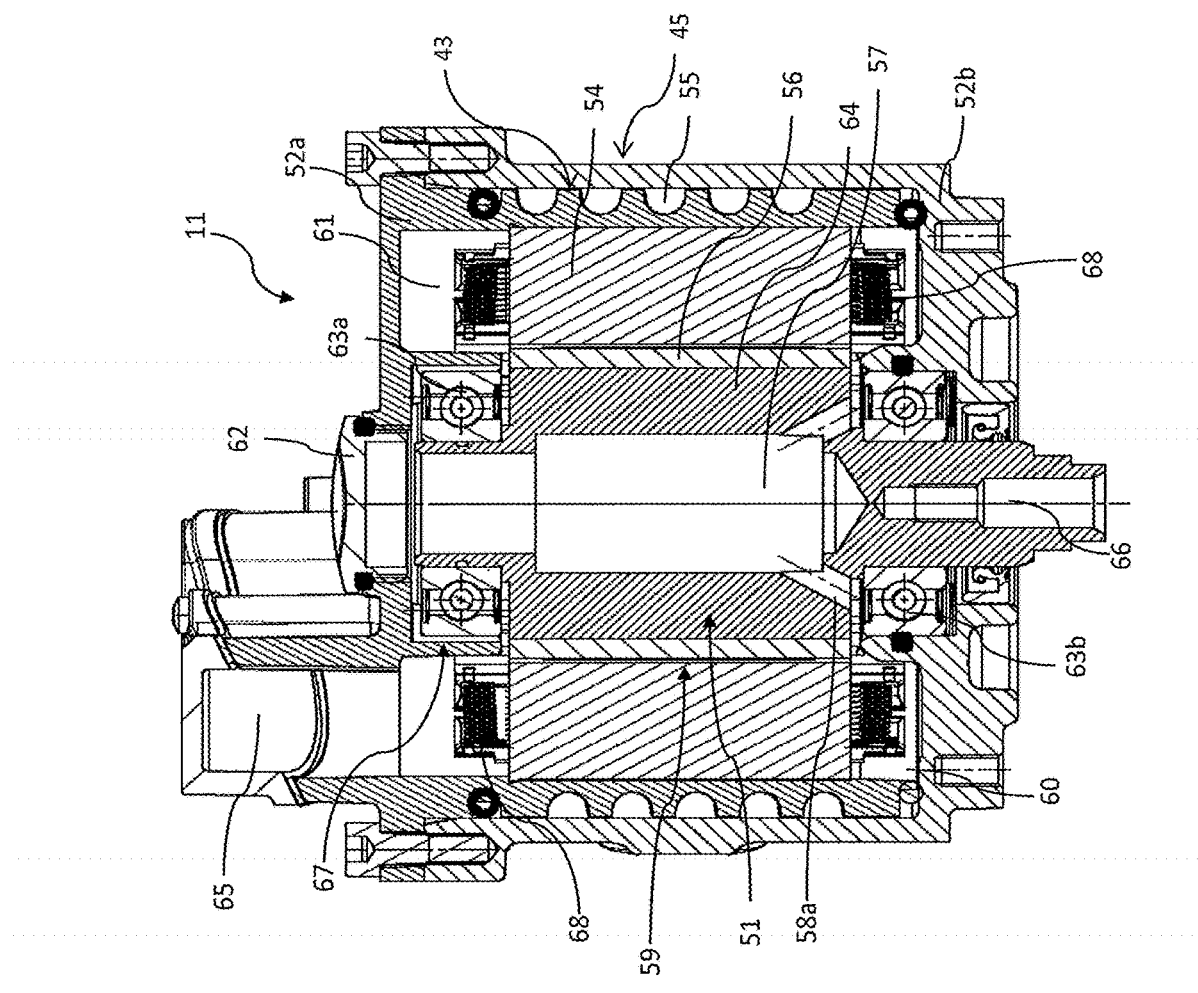
FIG. 10 show a cross section of a motor according to a preferred embodiment.

FIG. 10 shows a high frequency permanent magnet motor 11 according to an embodiment of the invention. The motor 11 is suitably for powering electric cutter 1: However, it could also be used in other applications where an electric HF motor is desirable.

The motor 11 is a synchronous motor and includes a motor housing 52a, 52b, ball bearings 63a, 63b that supports an inner rotor 51, and an outer stator 54 that surrounds the inner rotor 51 and being supported by the motor housing 52a, 52b. The stator 54 includes an iron core with three phase windings 68 that generate a rotating magnetic field when powered. A box 65 for electrical connections is located at one axial end of the motor 11.

The inner rotor 51 includes a rotor body 64, and a plurality of permanent magnets 56 arranged at the outermost radius of the rotor body. By having the magnets 56 at the outermost radius of the rotor body 64 the torque of the motor is higher than if they were placed closer to the rotational axis, i.e. the further away from the rotational axis the higher the torque of the motor 11 gets. Furthermore increasing numbers of magnets 56 around the rotor body 64 also increases the torque. Preferably the number of permanent magnets 56 around the rotor body 64 is within the range of 4-20, more preferably 6-16, most preferably 8-12. This enables a sufficiently high torque at a comparably low motor speed so that a gear ratio can be around 2:1 can be employed, thereby enabling the use of a belt transmission. The permanent magnets 56 are arranged in pairs, positioned opposite to each other at the outermost radius of the rotor body 64. The shown embodiment has 5 pole pairs. To get a speed of 100 revolutions per second you would need to feed 500 Hz (100×5).

The permanents magnets 56 may be glued to the rotor body 64 and additionally secured by ribbons (not shown), e.g. glass fiber ribbons or carbon fiber ribbons, wound around the rotor body 64 and the magnets 56. The magnets 56 can of course be secured to the rotor body 64 by other means, e.g. a plastic or metal tube pressing the magnets 56 to the rotor body 64. The magnets 56 may also be sintered to the rotor body 64.

The motor 11 is fed by an electric a power supply device 100. In another embodiment the power supply device 100 is an electric second motor of the same configuration as the motor 11. The difference is that it is run as a generator. The generator may be driven by a combustion engine, solar power, wind turbine, water turbine, batteries, fuel cells, nuclear energy, etc. By having the generator being of the same configuration as the motor 11, there is no need to transform the phases, since they are perfectly matched.

The rotor body 64 has a central cavity 57 which is accessible from the exterior via a plug 62 at one axial end of the rotor 51, defining an upper end of the cavity, and extending along the rotational axis of the rotor to the opposite axial end where a bottom end of the cavity is formed. The opposite axial end of the rotor body 64 further includes a bore 66 to which the input shaft of the transmission can be secured. The cavity 57 has a circular cross-section that is symmetric around the rotor axis, but the diameter of the cavity 57 may vary along the length of the cavity 57. A number of first evacuation channel/s 58a extends in a radial direction through the rotor body 64 from the bottom part of the cavity 57 towards the periphery of rotor body 64. The first evacuation channels 58a are preferably two and extending in opposite directions to maintain rotational symmetry. However, only one first evacuation channel 58a may be conceivable by balancing the rotor 51 by other means than retinal symmetry. More than two first evacuations channels 58a are also feasible. The central cavity 57 and the first evacuation channels 58a defining an inner volume 57, 58a of the motor 11.

An outer volume 59, 60, 61 of the motor 11 is defined by all voids outside the rotor 51 that are fluidly connected to the rotor cavity. In particular, a gap 59 between the rotor 51 and the stator 54, and optionally the spaces 60, 61 around the axial ends of the stator 54. The spaces 60, 61 around the axial ends of the stator 54 are preferably fluidly connected to the gap 59 and the inner cavity 57. It is however possibly that the spaces 60, 61 around the axial ends of the stator 54 are closed and not fluidly connected the gap 59 and inner cavity 57. In such embodiment it is possible to supply one oil, e.g. transformer oil, to the spaces 60, 61 around the axial ends of the stator 54, and different oil, e.g. lubricating oil, to the rotor cavity 57 and the outer volume connected thereto.

Although it is preferred to supply oil to the interior of the motor it may be possible to replace the oil with other liquids.

The cavity 57 is connected to the outer volume 59-61 by at least one first evacuation channel 58a which runs in a radial direction through the rotor body 64, preferably at least one pair of first evacuation channels 58a that are arranged rotational symmetric. At an upper end of the cavity 57, i.e. the end where the plug 62 is situated, there is provided at least one passage 67 connecting the upper end of inner cavity 47 to the outer volume 59, 60, 61. The passage 67 is preferably a recess or groove in the motor housing 57 in the region of the bearing 63a.

Preferably the interior of the motor 11 is filled with the oil by opening the plug 62 and pouring oil to the inner cavity 57. When pouring oil into the inner cavity, the oil will flow out to the outer volume 59-61 through the first evacuations channel/s 58a. Air in the outer volume 59-61 will gradually evacuate through the passage 67 and out via the plug opening as oil is filled.

For optimal cooling of the motor 11 the volume of the oil, supplied (the oil volume defined at an temperature of 23° C.) to the interior of the motor 11 corresponds to at least 50% of the outer volume 59-61, more preferably at least 80%, most preferably at least 100%. Preferably the oil volume fills 20-80% of the entire volume 57-61, i.e. the inner volume 57, 58a and the outer volume 59-61.

When the motor is run and the rotor 51 rotates, oil present in the cavity 57 will be urged by centrifugal forces through the channels 58a towards the outer volume 59-61, thereby at least partially filling the outer volume 59-61 with oil, preferably entirely filling the outer volume 59-61 with oil.

However, the entire volume 57-61 should not be fully filled with oil. On the contrary it is desirable to have an air pocket to reduce the pressure build up from oil expansion as it is heated. The purpose of the inner cavity 57 is to provide such an air pocket. At an oil temperature of 23° C., it is preferred that the air volume present in the entire volume. i.e. inner and outer volumes, corresponds to at least 25% of the inner cavity 57, preferably at least 50%, most preferably at least 80%. Furthermore, the inner cavity's 57 share of the entire volume 57-61 is preferably within the range of 10-90% of the entire volume 57-61, preferably within 25-60%. The entire volume 57-61 is preferably within the range of 50-300 ccm. Preferably the cavity 57 having a volume of 25-150 ccm.

The motor housing 52a. 52b includes two tubular parts, an inner tubular part 52a and an outer tubular part 52b, both having one axial end closed and the opposite open. The diameter of the inner tubular part 52a is somewhat smaller than that of the outer tubular part 52b so that the inner tubular part 52a can be inserted into the outer tubular part 52b, respective open end facing each other, to provide a cylindrical shaped motor housing 52a, 52b. The inner tubular part 52a has a groove running around its outer curved surface 43 forming a cooling path 55 within the side wall 45 of the motor housing 52a, 52b that is parallel to the rotor axis. The side wall 45 in the present application refers to the curved wall between the axial ends. The cooling path 55 has a shape of a circular helix and includes an inlet (14 in FIG. 6A) at one axial end of the motor housing 52a, 52b and an outlet (16 in FIG. 6A) at the opposite axial end. The inlet and the outlet provided in the outer tubular part 52b of the motor housing. Thereby the side wall 45 of the motor 11 can be actively cooled by a liquid flow.

To increase cooling performance the motor housing 52a, 52b is preferably made in a material being a good thermal conductor, for instance aluminum.

Figure 20:
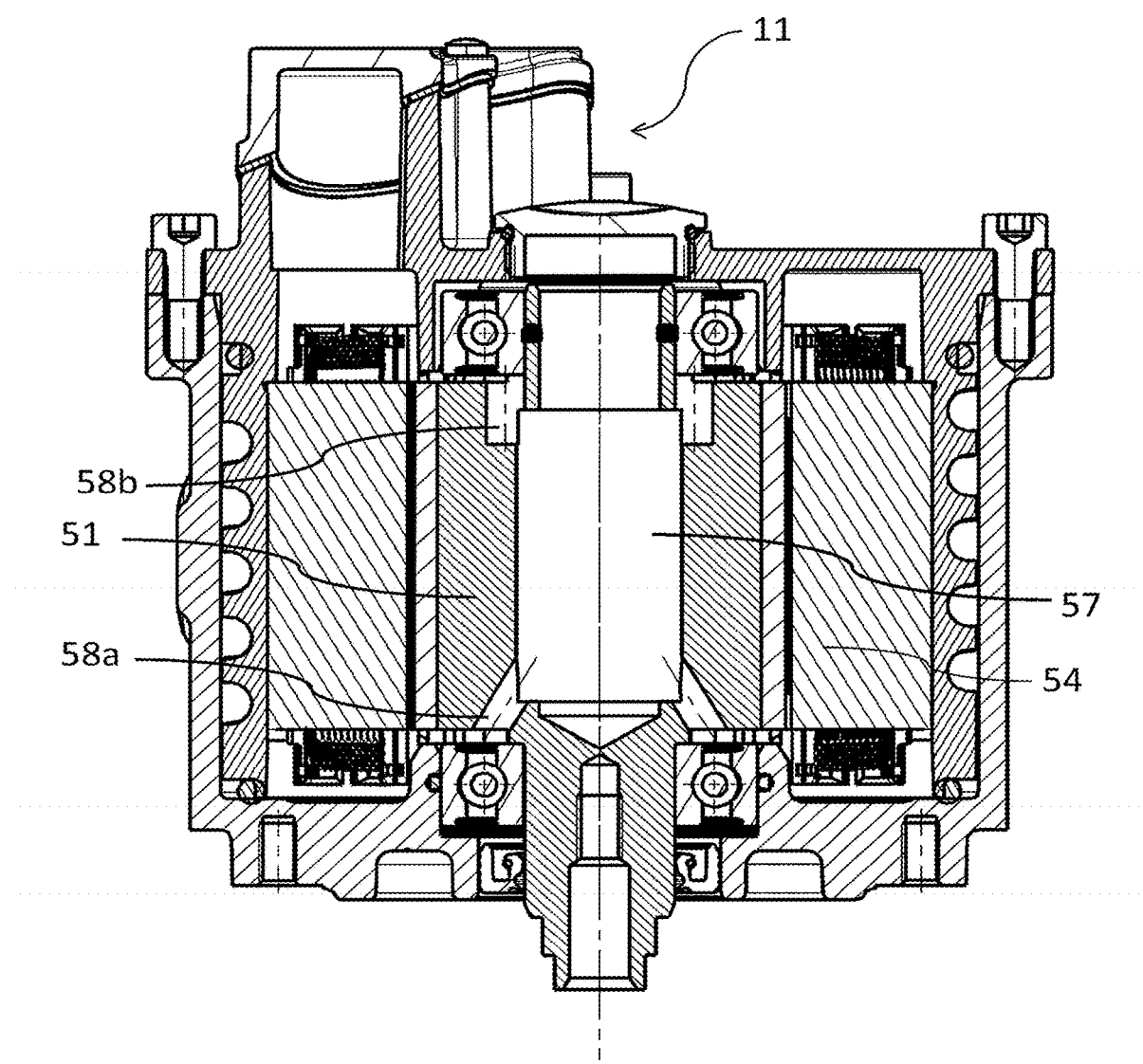
FIG. 20 shows a cross section of the motor of FIG. 10 having axially spaced apart evacuations channels to provide an inner flow during operation of the motor.

FIG. 20 shows a high frequency permanent magnet motor 11 according to another embodiment of the invention. The motor 11 is identical to that shown in FIG. 10 apart from that the cavity 57 includes a number of second evacuation channel/s 58b axially spaced apart from the first evacuation channel/s 58a and connecting to the outer volume 59-61 at the opposite axial end of the cavity 57.

The first evacuation channel/s 58a are configured to provide a stronger pump effect when the rotor is rotated than that of the second evacuation channel/s 58b in order to create a pump effect when rotating the rotor, thereby providing a flow inside the motor with one flow direction within the cavity 57 and the opposite flow direction in the gap 59.

In the shown embodiment the stronger pump effect is provide by connecting the first evacuation channel/s 58a to the outer volume 59-61 at a radial distance further away from the rotational axis than the radial distance that the second evacuation channel/s 58b connects to the outer volume 59-61. Other means of achieving a difference in pump effect can of course be implemented. Furthermore the second evacuation channel/s 58b may alternatively be configured to provide a stronger pump effect when the rotor is rotated than that of the first evacuation channel/s 58a.

Figure 21:
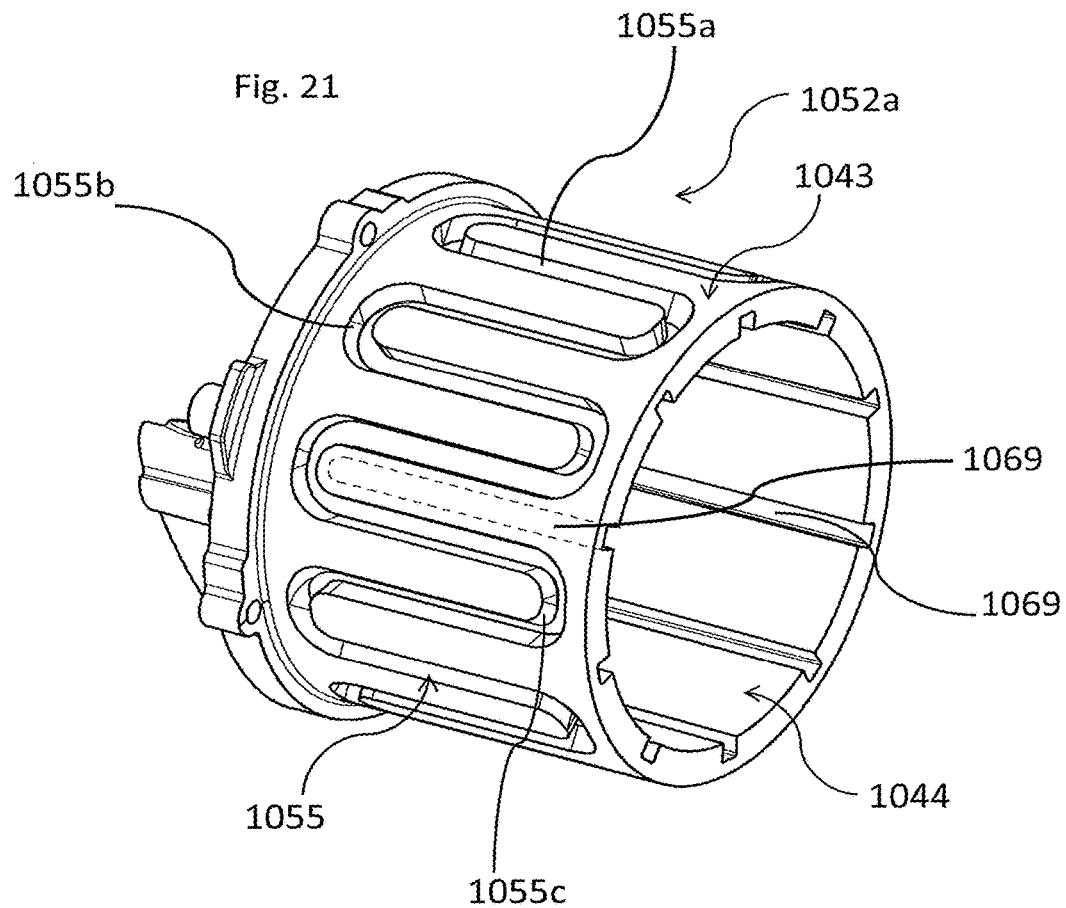
FIG. 21 shows an embodiment of an inner tubular part of a motor housing according to one embodiment.

FIG. 21 shows an embodiment of the inner tubular part of the motor housing of FIG. 10. In FIG. 21 the reference number 1052a is used for the inner tubular part whereas 52a is used in FIG. 10. The inner tubular part 1052a mates with the outer tubular part 52b in the same manner as described in relation to FIG. 10 providing a cylindrical motor housing 1052a, 52b.

A cooling path 1055 is formed by an outer groove on the outer curved surface 1043 of the inner tubular part 1052a. The cooling path 1055 runs back and forth in the axial direction forming a meander pattern between the two tubular parts 1052a, 52b, i.e. within the side wall 45 of the motor housing 1052a, 52b.

The cooling path 1055 includes a plurality of first cooling sections 1055a running in a direction parallel to the rotor axis and being essentially equidistantly distributed at a predetermined radius from the rotor axis, and a plurality of second and third cooling sections 1055b, 1055c. The second cooling sections 1055b connecting two adjacent first cooling sections at one axial end thereof, and the third cooling sections 1055c connecting two adjacent first cooling sections at the opposite axial end, in such manner that the second and the third cooling sections 1055b, 1055c never connect the same pair of first cooling sections. Thereby the meander pattern is formed.

The inner tubular part 1052a further includes a at least one inner groove 1069 (here exemplified by ten inner grooves) spatially arranged between two adjacent first cooling sections 1055a and running in a direction parallel to the rotor axis. The at least one inner groove is preferably a plurality of inner groves; more preferably the number of inner grooves are within the range of 5-20. The inner grooves 1069 are distributed around the inner curved surface 1044 of the inner tubular part, which also is the inner curved of the motor housing 1052a; 52b, in such way that two first cooling sections 1055a are located between two adjacent inner grooves 1069. This makes it inner and outer grooves can be incorporated without requiring too large wall thickness of the inner tubular part 1052a Preferably the inner groove/s 1069 extends between the axial ends of stator 54 and is fluidly in contact with the outer volume 59-61.

Figure 22:
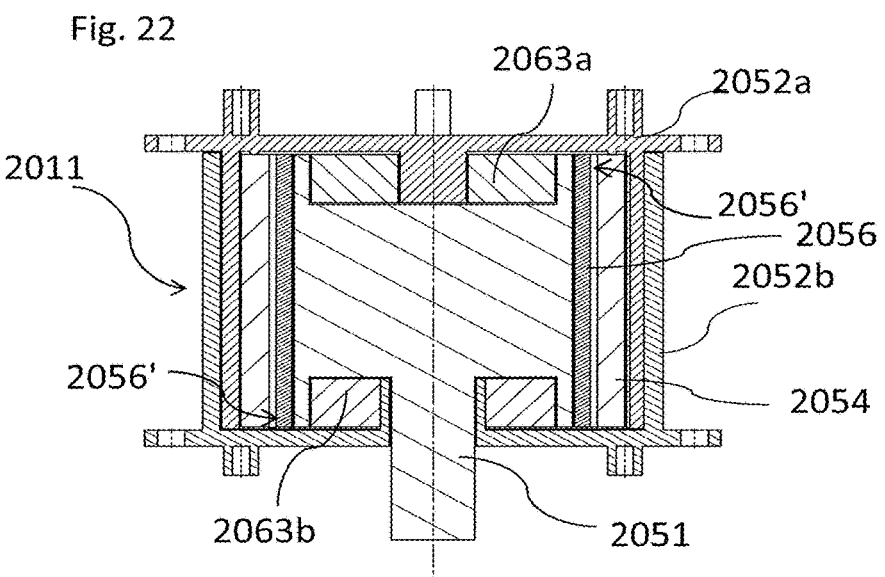
FIG. 22 shows an embodiment of the motor having the bearings axially within the permanent magnets of the rotor.

In FIG. 22 is shown an embodiment of the motor. For similar parts the same numbers have been used as of FIG. 10 but in the 2000-series. Thus the motor is designated 2011 and includes a motor housing 2052a, 2052b. An outer stator 2054 in the motor housing surrounds an inner rotor 2051 having permanent magnets 2056 arranged at its outer radius. The rotor 2051 is supported by bearings 2063a, 2063b at each axial end of the rotor 2051. The bearings 2063a, 2063b are located within the axial outermost permanent magnets 2056' of the rotor 2051. Thereby the axial extension of the motor 2011 can be minimised.

The axial length is preferably reduced by having the bearings and the rotor are arranged so that at least 50% of their axial length extends within the axial outermost permanent magnets 2056' of the rotor 2051, more preferably at least 80%, most preferably at least 90%.

Figure 11A:
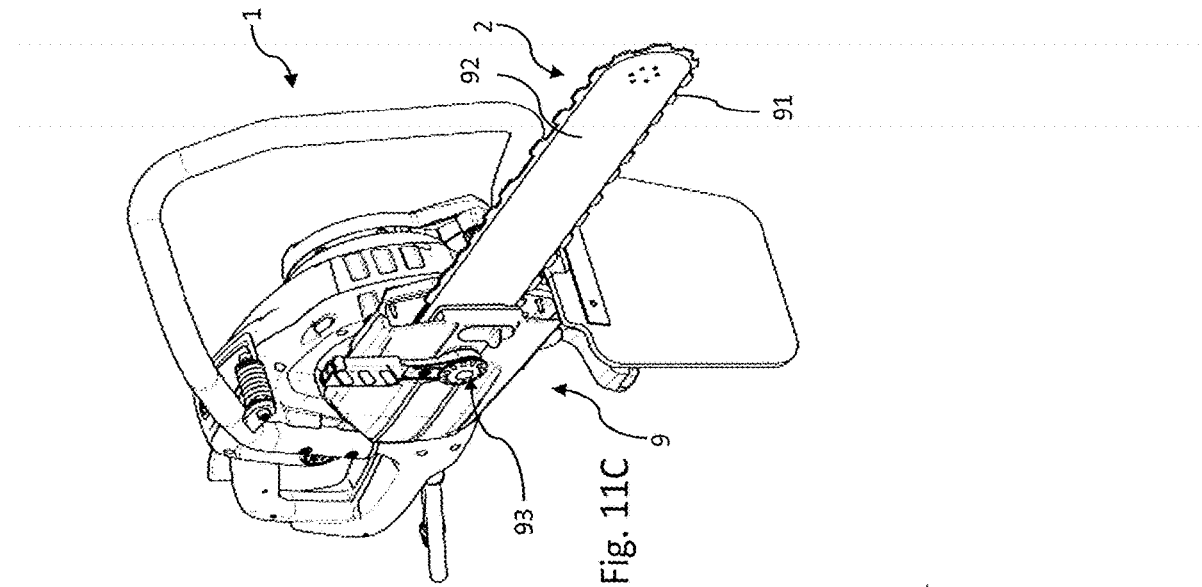
FIGS. 11A-C shows various electric cutter machines.

FIG. 11A shows an electric power saw/cutter 1 where the rotatable saw structure 2 is a ring saw blade 71 and the saw structure drive arrangement 9 is a ring saw aggregate 72a, 72b.

Figure 11B:
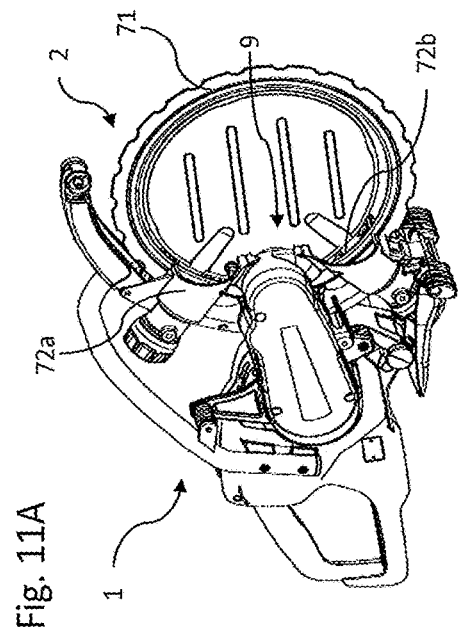

FIG. 11B shows an electric power saw/cutter 1 where the rotatable saw structure 2 is two circular saw blades 81, 82 at an axial distance from each other and the saw structure drive arrangement 9 is a common saw blade drive shaft 83 driving both saw blades 81, 82.

Figure 11C:
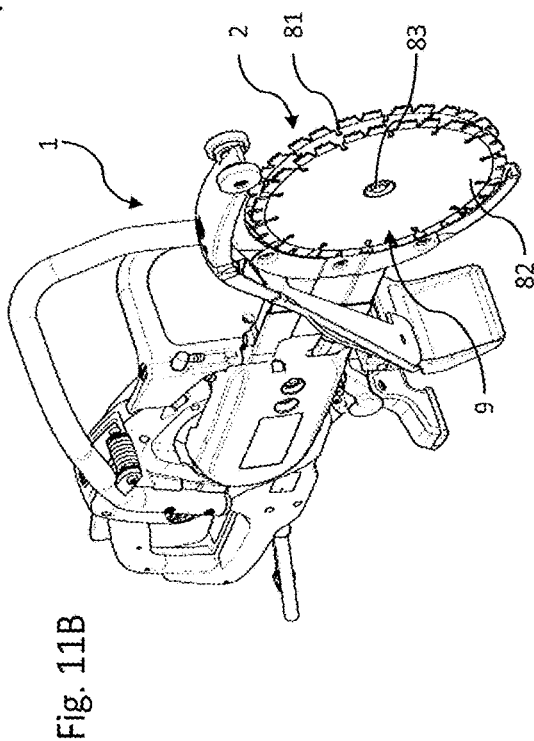

FIG. 11C shows an electric power saw/cutter 1 where the rotatable saw structure 2 is a saw chain 91 and the saw structure drive arrangement 9 is a saw chain sword 92 and a chain drive wheel 93 making the saw chain rotate around the sword 92.

Figure 12:
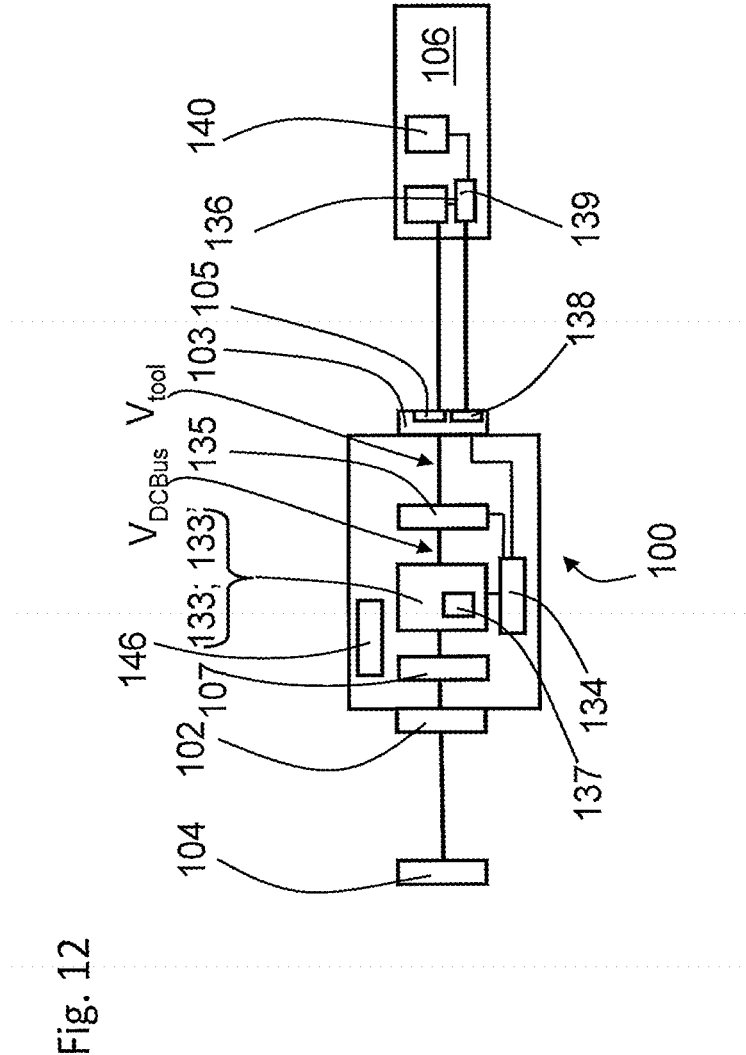
FIG. 12 shows a schematic view of a power inlet, a power supply device including an input rectifier, a converter assembly, an output inverter and an electrically powered tool.
Figure 13:
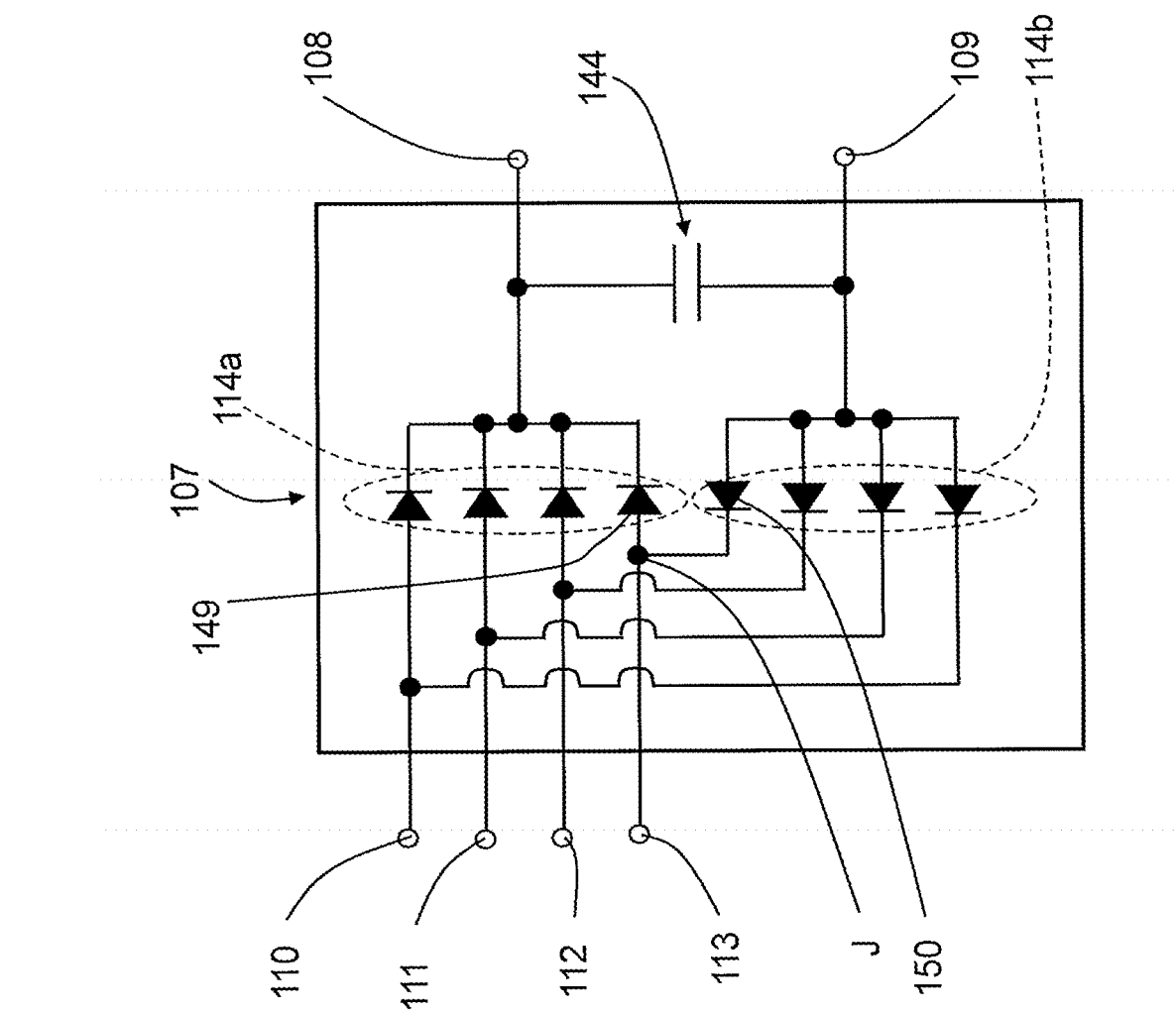
FIG. 13 shows a simplified schematic of the input rectifier comprised in the power supply device of FIG. 12.

With reference to FIG. 12 and FIG. 13, an electrically powered tool 106 and a power supply device 100 are shown schematically. The tool is for example an electric cutter or an electric drill motor. The tool 106 comprises a synchronous motor 136 which is fed with power from a power supply device. The power supply device 100 comprises a power input 102 and a tool interface 103, where the power input 102 is arranged to be connected to a power source inlet 104, such as an AC mains inlet. In this example, the power input 102 comprises three alternating current power ports 110, 111, 112. The tool interface 103, comprising a power output 105, is arranged to be connected to an electrically powered tool 106. The power output 105 is arranged to provide an alternating voltage $V_{tool}$, with a certain controllable frequency $f_{tool}$ to the electrically powered tool 106. Further between power input 102 and power output 105 the power supply device of FIG. 12 comprises three main parts: an input rectifier 107, a converter assembly 133; 133' and an output inverter 135. It is to be understood that in other variants one, two or all of these parts could be included in the power tool 106 instead. It is also to be noted that all connections shown in FIG. 12 are of a schematic nature, and may comprise two or more separate electric conductors each, as is evident from the context.

The tool interface 103 also comprises a communication interface 138, arranged for communicating with the tool 106. For this purpose, the tool 106 comprises a tool communication interface 139. In order to control all communication between the power supply device 100 and the tool 106, the power supply device 100 comprises a control unit 134 and the tool 106 comprises a tool control unit 140.

For example, if a user presses a speed button on the tool 106, the tool sends a request for increased output frequency to the control unit 134 in the power supply device 100 via the communication interface 138. The control unit 134 then controls a frequency increase of the controllable frequency $f_{tool}$. Other communication may for example comprise identification of the tool 106 presently connected to the power supply device 100.

According to the present invention. the power input 102 comprises a neutral port 113 which is connected to a voltage that in normal conditions is the average of the voltages of said alternating current power ports. In this example, the neutral port 113 is connected to a junction J between the alternating current power ports 110, 111, 112, where the current equals zero at an even load.

Using the neutral connection is advantageous since it enables an enhanced performance if power is lost at one or more of the alternating current power ports 110, 111, 112 compared to with the case where a neutral connection is not used. As an example, the use of the neutral connection results in resulting remaining a power of 75% instead of 50% if power is lost at one of the alternating current power ports 110, 111, 112, and a resulting remaining a power of 40% instead of 0% if power is lost at two of the alternating current power ports 110, 111, 112. The figures are approximate, but indicate the magnitude of this advantage.

The power supply device 100 further comprises an input rectifier 107 that is connected to the power input 102 and comprises a positive output line 108 and a negative output line 109. The input rectifier 107 further comprises a first set 114a of rectifying diodes connected between, on one hand, the alternating current power ports 110, 111, 112 and the neutral port 113, and, on the other hand, the positive output line 108. The input rectifier 107 also comprises a second set 114b of rectifying diodes connected between, on one hand, the alternating current power ports 110, 111, 112 and the neutral port 113, and, on the other hand, the negative output line 109. A smoothing capacitor 144 is connected between the output lines 108, 109.

As shown in FIG. 13, the neutral port 113 is connected to a first rectifying diode 149 which is connected to the positive output line 108, and to a second rectifying diode 150 which is connected to the negative output line 109. The first rectifying diode 149 is comprised in the first set 114a of rectifying diodes and the second rectifying diode 150 is comprised in the second set 114b of rectifying diodes.

Figure 14:
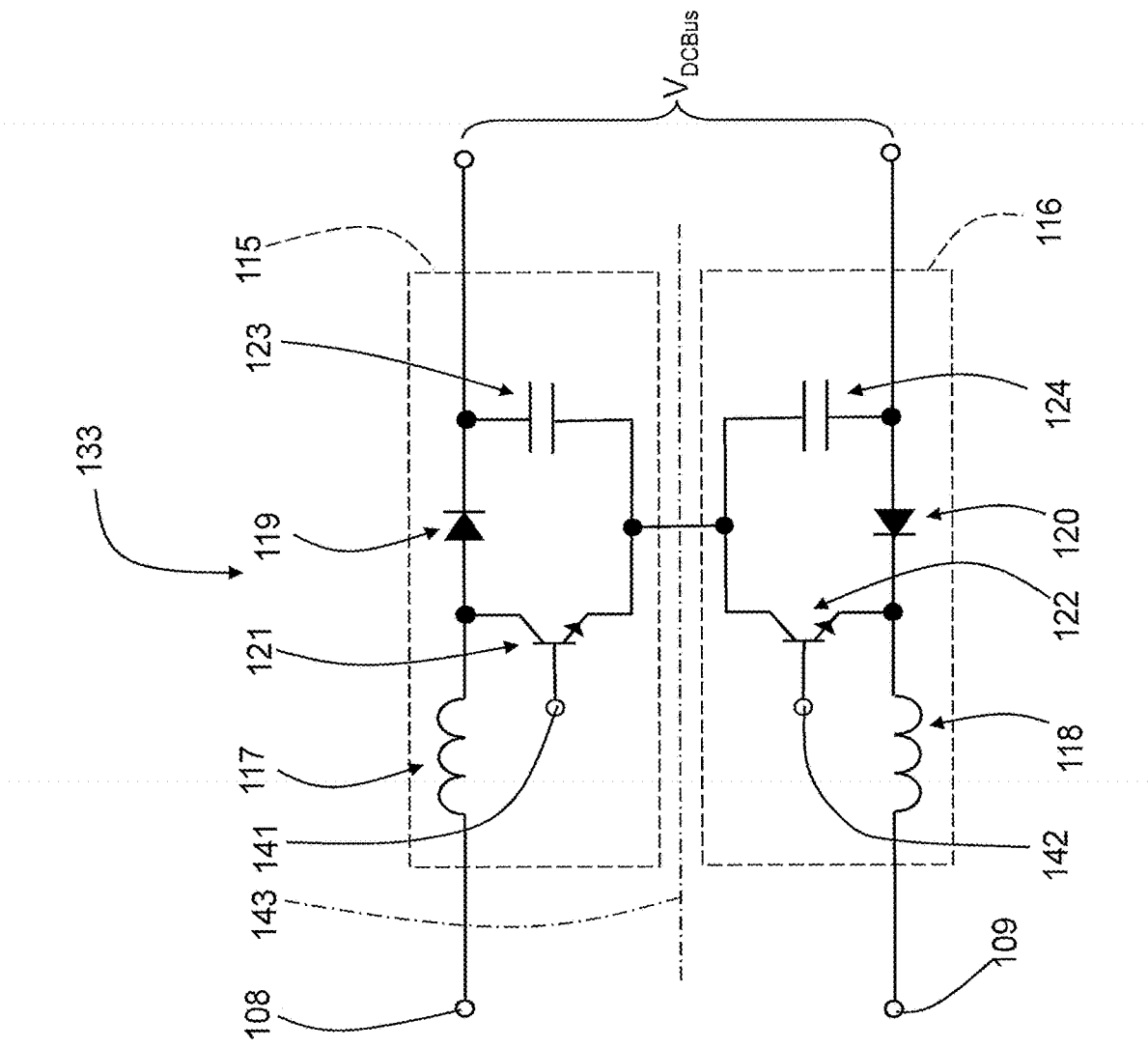
FIG. 14 shows a simplified schematic of a type of a converter assembly comprised in the power supply device of FIG. 12.

According to another aspect of the present invention, also with reference to FIG. 14, the power supply device 100 comprises a converter assembly 133 which in turn comprises a first converter unit 115 and a second converter unit 116. Each converter unit 115, 116 comprises a respective first inductance 117 and second inductance 118 connected in series between an input rectifier output line 108, 109 and a respective first rectifying device 119 and second rectifying device 120. Each converter unit 115, 116 also comprises a respective first controllable switch device 121 and second controllable switch device 122 and also a respective first capacitance 123 and second capacitance 124. The controllable switch devices 121, 122 and the capacitances 123, 124 are connected in parallel over the respective rectifying device 119, 120.

The converter units 115, 116 are connected to each other such that the parallel connections of the respective controllable switch devices 121, 122 and capacitances 123, 124 are connected in series, the voltage over the capacitances 123, 124 constituting an output DC bus voltage $V_{DCBus}$. Each controllable switch device 121, 122 is arranged to control charge and discharge of electrical energy to and from its corresponding inductance 117, 118 such that the output DC bus voltage $V_{DCBus}$ is maintained at a desired level.

In this example, the rectifying devices 119, 120 are in the form of diodes, and the controllable switch devices 121, 122 are in the form of transistors. In order to control the switching properties of each transistor 121, 122, each transistor 121, 122 comprises a corresponding control port 141, 142 that is connected to the control unit 134.

In this example, the power supply device 100 thus comprises a converter assembly 133 which in turn comprises a first converter unit 115 and a second converter unit 116, where the first converter unit 115 and a second converter unit 116 are mutually mirrored in an imaginary symmetry line 143 indicated in FIG. 14.

The use of a converter assembly 133 is advantageous since it enables different power inputs, even a single phase power source may be used by means of a hardware adapter. For example, in Japan a common supplied voltage is 3×180 V AC and in Europe a common supplied voltage is 3×400 V AC or 1×230 V AC. Input frequencies may also vary, in Europe it is 50 Hz and in the United States it is 60 Hz. The use of a converter assembly 133 is also advantageous since it enables a more even current consumption.

The mirror coupling of two converter units 115, 116 within the converter assembly 133 is advantageous since it enables the use of components with lower power ratings, for example the capacitances 123, 124. Components with lower power ratings are more efficient and less expensive. Furthermore, the mirror coupling also provides an automatic balance of the output DC bus voltage $V_{DCBus}$ over the capacitances 123, 124.

Figure 15:
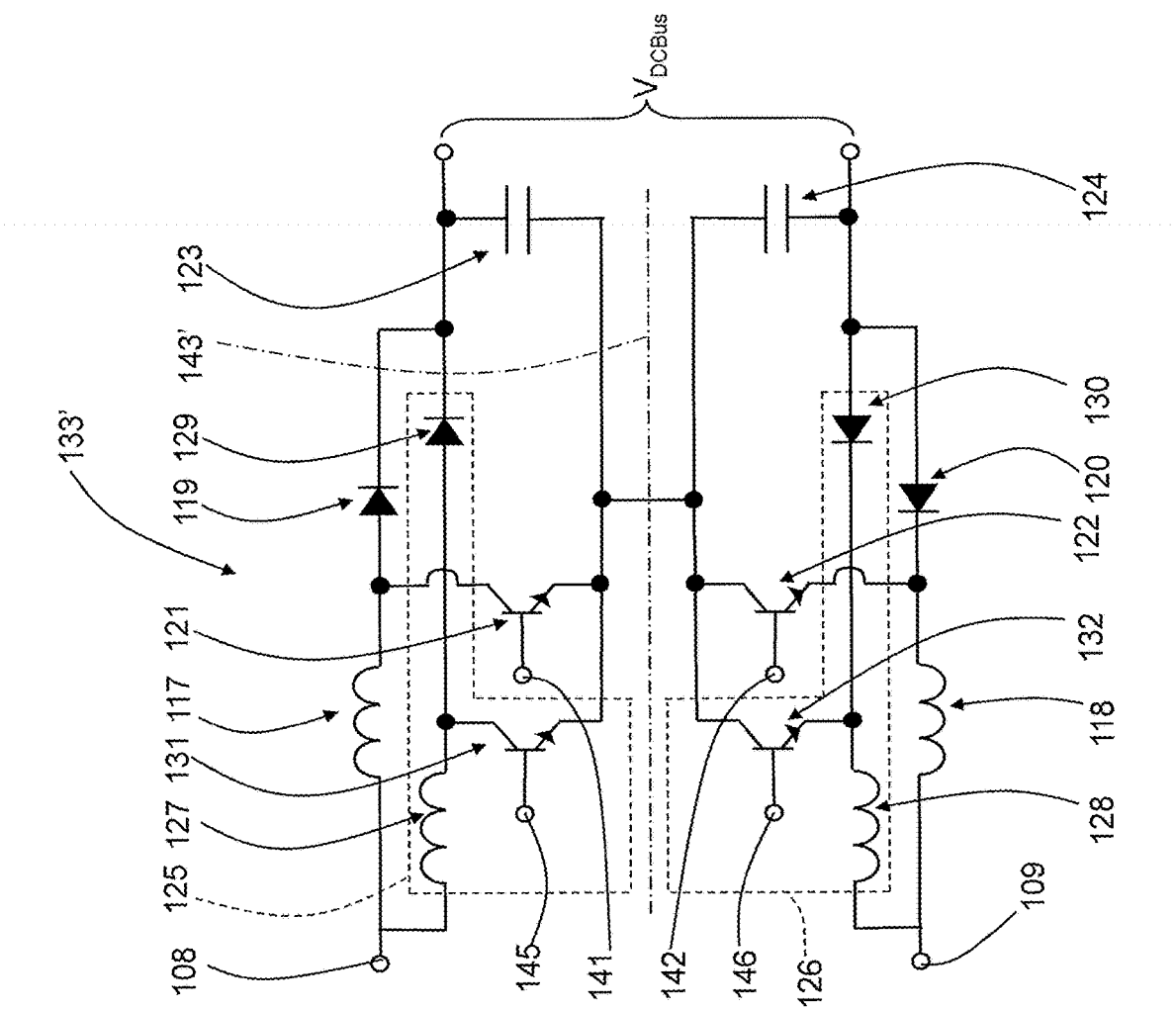
FIG. 15 shows a simplified schematic of an alternative type of converter assembly comprised in the power supply device of FIG. 12.

According to another example, with reference to FIG. 15, an alternative converter assembly 133' further comprises a first parallel converter unit 125 and a second parallel converter unit 126. Each parallel converter unit 125, 126 comprises a respective first parallel inductance 127 and second parallel inductance 128 connected in series with a respective first parallel rectifying device 129 and second parallel rectifying device 130. Each parallel converter unit 125, 126 also comprises a respective first parallel controllable switch device 131 and second parallel controllable switch device 132. The first parallel controllable switch device 131 is connected between said first parallel inductance 127 and said first parallel rectifying device 129, and the second parallel controllable switch device 132 is connected between said second parallel inductance 128 and said second parallel rectifying device 130.

The first parallel converter unit 125 is connected in parallel with the first converter unit 115, and the second parallel converter unit 126 is connected in parallel with the first converter unit 116 such that the rectifying devices 119, 129 and the controllable switch devices 121, 131 of the first converter unit 115 and the first parallel converter unit 125 are connected over the capacitance 123 of the first converter unit. In the same way, the rectifying devices 120, 130 and the controllable switch devices 122, 132 of the second converter unit 116 and the second parallel converter unit 126 are connected over the capacitance 124 of the second converter unit 116.

In this example, the rectifying devices 119, 120; 129, 130 are in the form of diodes, and the controllable switch devices 121, 122; 131, 132 are in the form of transistors. In order to control the switching properties of each transistor 121, 122; 131, 132, each transistor 121, 122; 131, 132 comprises a corresponding control port 141, 142; 145, 146 that is connected to the control unit 134.

In this example, the power supply device 100 thus comprises an alternative converter assembly 133' which in turn comprises the first converter unit 115, the first parallel converter unit 125, the second converter unit 116 and the second parallel converter unit 126. The first converter unit 115 and the first parallel converter unit 125 are essentially connected in parallel, and the second converter unit 116 and the second parallel converter unit 126 are essentially connected in parallel. The first converter units 115, 125 and the second converter units 116, 126 are mutually mirrored in an imaginary symmetry line 143' indicated in FIG. 15.

A reason for having four converter units 115, 116; 125, 126 connected according to the above is that this enables a better handling of possible relative large currents where the input voltage may be relative low.

For all examples above, the power supply device 100 comprises an output power converter 135, arranged to convert the output DC bus voltage $V_{DCBus}$ to an AC voltage $V_{tool}$ suitable for the electric motor 136, the AC voltage having a frequency $f_{tool}$ that corresponds to the desired rotational speed of the electrically powered tool 106. The output power converter 135 is for example in the form of an insulated gate bipolar transistor, IGBT, converter, which is previously known. It is also known that instead of using IGBT transistors the converter can use metal over semiconductor field effect transistors, MOSFETs. As an example, the output AC voltage $V_{tool}$ may comprise three alternating current phases with an output voltage of 690 V peak to peak. The output power converter 135 may furthermore be arranged to provide a soft start by means of a controlled increase of the output frequency $f_{tool}$ to the presently desired value.

Furthermore, the power supply device 100 comprises a braking resistor assembly 137 that is arranged to be engaged in dependence of the output DC bus voltage $V_{DCBus}$. More in detail, according to an example illustrating the function of the braking resistor assembly 137, the output is normally 750 V DC.

1. The converter assembly 133; 133' is disengaged if $V_{DCBus}$ exceeds 780 V DC.
2. the braking resistor assembly 137 is engaged when $V_{DCBus}$ exceeds 800 V DC, and
3. the motor brake is disengaged when $V_{DCBus}$ exceeds 820 V DC.

The above also works in the reverse order if the output DC bus voltage $V_{DCBus}$ starts to fall. In the general case the converter assembly (133; 133') is disengaged at a first threshold value for the DC bus voltage ($V_{DCBus}$), and the braking resistor assembly 37 is engaged at a second threshold value for the DC bus voltage $V_{DCBus}$. In the example above, the second threshold value exceeds the first threshold value.

It is possible that the converter assembly 133; 133' is disengaged and the braking resistor assembly 137 is engaged at the same value of the DC bus voltage $V_{DCBus}$, i.e. that the second threshold value is equal to the first threshold value.

Generally, the power input for generating the DC bus voltage ($V_{DCBus}$) is arranged to be decreased or disengaged in dependence of the output DC bus voltage ($V_{DCBus}$).

Figure 16:
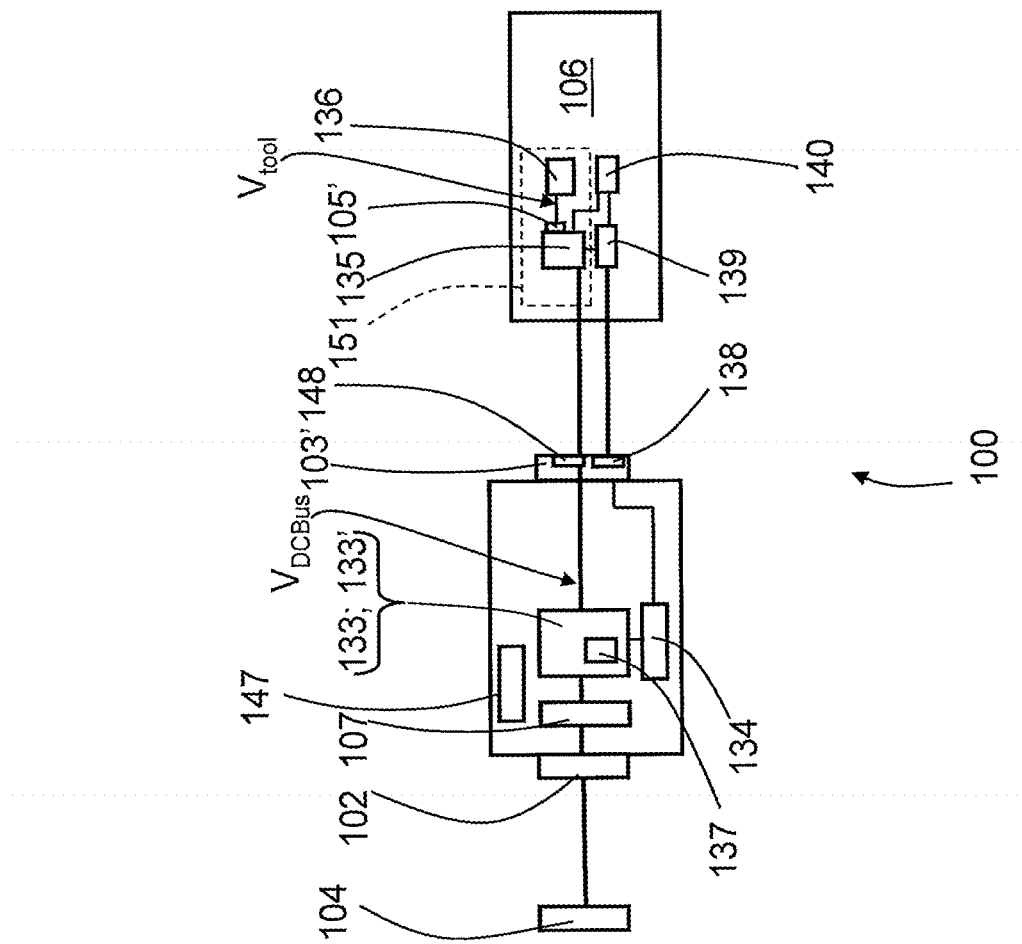
FIG. 16 shows a schematic view of an alternative configuration for the power supply device and the electrically powered tool shown in FIG. 12.

With reference to FIG. 16, an alternative configuration for the power supply device 100' and the electrically powered tool 106' is shown. Here, the power supply device 100' comprises a tool interface 103' which is arranged to supply a DC bus voltage ($V_{DCBus}$) to a brushless direct current (BLDC) motor 151. The BLDC motor 151 comprises an electric motor 136 and an output power converter 135 according to the above. As in the previous case, the output power converter 135 is arranged to convert the DC bus voltage $V_{DCBus}$ to an AC voltage $V_{tool}$ suitable for the electric motor 136, the AC voltage having a frequency ($f_{tool}$) that corresponds to the desired rotational speed of the BLDC motor (51). Thus, in this case, the tool 106' also comprises the output power converter 135, where the output power converter 135 and the electric motor 136 together form the BLDC motor 151.

In this case, the power supply device 100' comprises a DC power output 148 arranged for outputting the DC bus voltage $V_{DCBus}$ to the tool 106', and the output power converter 135 has a power output 105' arranged for outputting the alternating voltage $V_{tool}$ with the controllable frequency $f_{tool}$ to the motor 136'. Here, the output power converter 135 is shown connected to the tool control unit 140, and it is conceivable that the tool control unit 140 either by itself, or together with the control unit 134 in the power supply device 100', controls the output power converter 135. It is also possible that only the control unit 134 in the power supply device 100' controls the output power converter 135.

The present invention is not limited to the above, but may vary freely within the scope of the appended claims. For example, instead of using an input rectifier 107 as described above, any suitable DC input may be used, such as for example a battery.

Furthermore, the power input 102 may be arranged for receiving an input voltage from an engine-driven generator, where the generator is of the same type as the electric motor 136. The electric motor 136 is for example in the form of a brushless direct current, BLDC, motor, which may be of a synchronous type.

The control unit 134 may be arranged to detect if the neutral connection is present at the power input 102, the control unit 134 further being arranged to control the output voltage in dependence of the presence of said neutral connection. For example, if there is no neutral connection, the output power may be reduced.

The control unit may further be arranged to detect if electrical power is present at the alternating current power ports 110, 111, 112, the control unit 134 further being arranged to control the output voltage in dependence of the loss of said phase connection. For example, if there are alternating current power ports lacking electrical power, the output power may be reduced.

For a three phase system, the voltages at the alternating current power ports 110, 111, 112 have a phase difference of 120 degrees, which makes the rectified incoming voltage smooth and steady. If one or two phases are missing at the alternating current power ports 110, 111, 112, the rectified voltage pulses and the instantaneous amount of power that is possible to acquire from mains outlet varies with the incoming voltage period. The amount of power that is possible to utilize depends on the phase difference between the incoming lines.

A three phase power cord typically consists of five wires: a protective ground port, the neutral port 113 and the three alternating current power ports 110, 111, 112. However, in some installations, the neutral port 113 and one of the alternating current power ports 110, 111, 112 can be mixed up. There are also systems that do not supply a neutral port, leaving it floating. Alternatively, one of the alternating current power ports 110, 111, 112 can be connected to one or two of the other ports, making an apparently valid voltage appear on two or three ports. However, since the phase in that case is the same for those ports, it is not possible to utilize the provided power to its full extent. Another problem is a possible voltage potential difference between the protective ground port and the neutral port 113, which makes it difficult to have a good voltage reference level for the voltage measurements.

In order to handle the above, the control unit 134 is arranged to analyze the connected ports and determine how much power that it is possible to acquire. The main analysis is performed by means of a software algorithm that in general works like described below.

Figure 17:
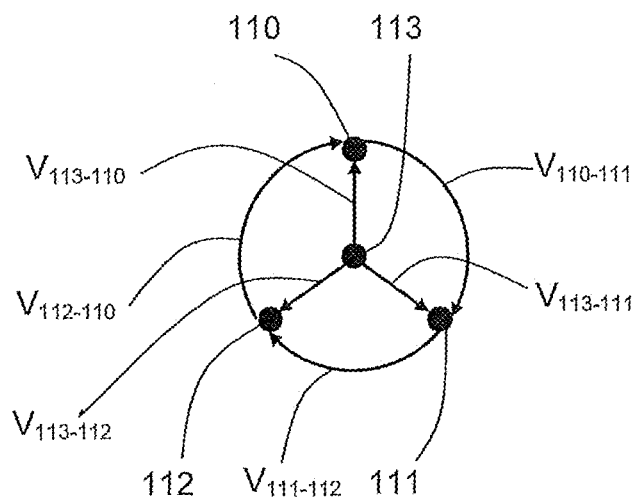
FIG. 17 shows a schematical illustration of power ports and voltages in a three-phase system.

The algorithm starts by measuring all incoming phases on the alternating current power ports 110, 111, 112 and the neutral port 113 relative an internal voltage reference. With reference to FIG. 17, showing a schematical illustration of the power ports and voltages available in a three-phase system, all possible main voltages are calculated; the corresponding voltages on the alternating current power ports 110, 111, 112 are referred to as $V_{110\text{-}111}$, $V_{111\text{-}112}$ and $V_{112\text{-}110}$.

Since it is not known whether the neutral port 113 has been exchanged with any of the alternating current power ports 110, 111, 112, the main voltage candidates are $V_{110\text{-}111}$, $V_{111\text{-}112}$ and $V_{112\text{-}110}$, $V_{110\text{-}113}$, $V_{111\text{-}113}$ and $V_{112\text{-}113}$. Each main voltage candidate is determined to be qualified by having a signal magnitude elevated from the noise and a valid period. Then, the largest of these is assumed be a valid first main voltage, or for single phase, the one and only phase voltage. For the remaining voltages, the phase relation to the first main voltage is determined by analysis in time domain. If the considered candidate voltage has a phase relation of ±120° relative the first main voltage, it is determined to be a second main voltage.

At the end of the analysis, 1-3 voltages have been acquired, each with its own phase. Using that information, a judgment about the available power can be made and signaled to the tool 106, for example to the tool control unit 140.

It is thus possible to use the tool 106 in a controlled manner for a lot of different electrical configurations spanning numbers of input phases, voltages and voltage potential relative protective ground.

The above does not require a three-phase system with a neutral connection, but requires in its most uncomplicated form a power input 102 comprising at least two ports 110, 111, 112, 113 between which there is a voltage potential. This voltage potential does not have to be alternating.

Generally, the control unit 134 is arranged to determine the voltage between each port comprised in the power input 102, and to select those voltages that exceed a predetermined threshold value during a certain time period, the control unit 134 further being arranged to compare the phase relations of the selected voltages and based on this comparison determine the amount and composition of available power.

The control unit 134 is furthermore arranged to communicate the amount and composition of available power, enabling control of the motor in dependence of the amount and composition of available power.

Figure 18:
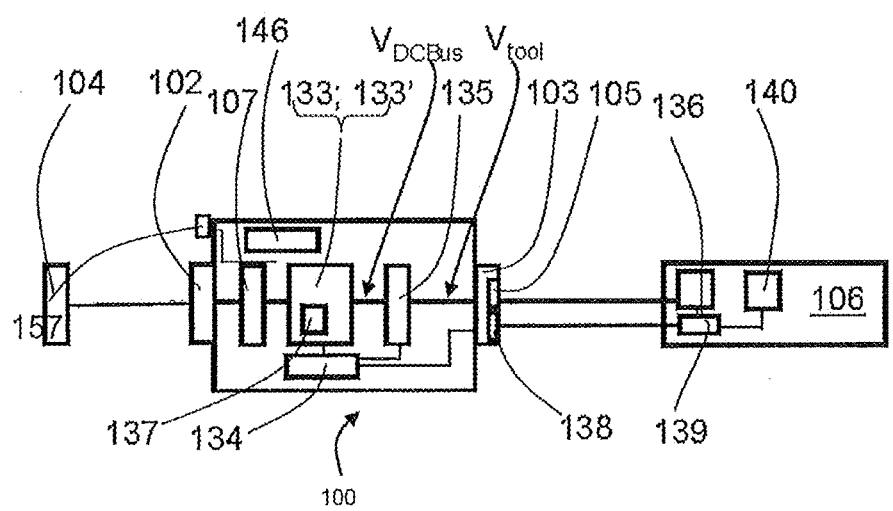
FIG. 18 shows a schematic view of an alternative configuration for the power supply device and the electrically powered tool shown in FIG. 12.

The algorithm may be at least partly implemented in the control unit 134 and/or the tool control unit 140. As shown in FIG. 18, the power input 102 is shown to comprise an input analyzer 157 that is connected to the control unit 134. Other arrangements are of course conceivable.

Figure 19:
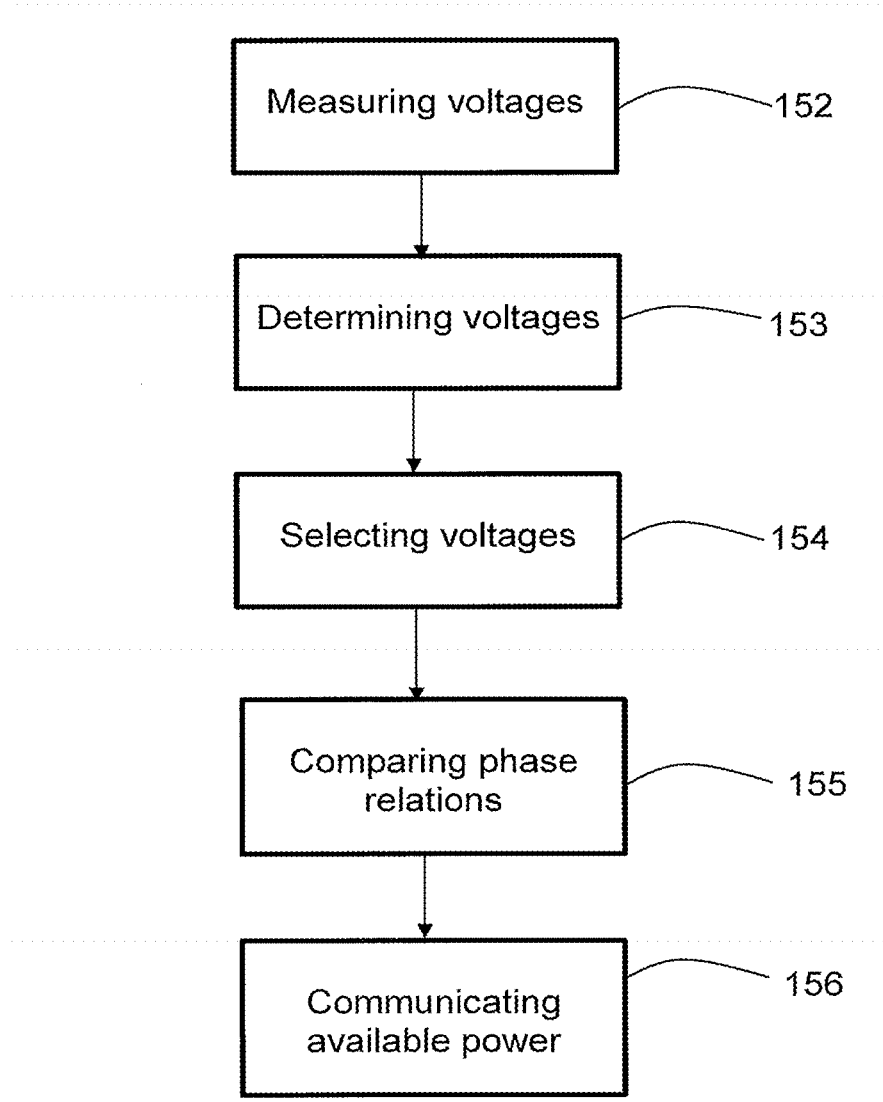
FIG. 19 shows a flowchart for a method enabling enhanced control and communication of available power.

With reference to FIG. 19 showing a flowchart, the above is performed by means of a general method for providing an estimate of available power to an electrically powered tool 106, the method comprising the steps:

152: measuring all voltages between all ports at a power input 102 with at least two ports 110, 111, 112, 113 between which there is a voltage potential;

153: determining all possible voltages between said ports 110, 111, 112, 113;

154: selecting those voltages that exceed a predetermined threshold value during a certain time period;

155: comparing the phase relations of the selected voltages and based on this comparison determine the amount and composition of available power; and 156: communicating the amount and composition of available power to the electrically powered tool 106.

As mentioned above, said voltage potential between ports 110, 111, 112, 113 does not have to be alternating, but may of course be alternating.

The control unit 134 may further be arranged to detect if the tool 106 is connected to the tool interface 103, and if that is the case, to indicate at a display 147, comprised in the power supply device 100, what type of electrically powered tool 106 that is connected to the tool interface 103. At the display 147 there may be user control buttons (not shown), which for example may be used for choosing different functions. Other messages, such as for example present power supply and error messages, may be indicated in the display 147.

As shown in FIG. 12, it has been assumed that the power supply device 100 is separate and easily detachable from the tool 106, but it is also conceivable that the power supply device 100, or at least some of its parts, instead are integrated into the tool 106, for example as shown with reference to FIG. 16. Other alternatives are of course conceivable, even the case where all parts of the power supply device 100 are integrated into the tool 106.

Furthermore, the power supply device 100 may comprise a residual current device 50 arranged to break the circuit in the case of a current imbalance in a previously known manner. The residual current device may be comprised in the power input 102, or may be constituted by a separate device 50, as shown in FIG. 1.

All figures disclosed are to be regarded as examples only, for example the voltages disclosed may of course vary in order to be of a suitable magnitude.

The electric motor 136 may be an asynchronous motor as well as a synchronous motor.

The converter assembly 133; 133', either in its entirety or at least partly, is commonly known as a power booster or a voltage booster.

When it is indicated that the neutral port 113 is connected to a voltage that in normal conditions is the average of the voltages of said alternating current power ports 110, 111, 112, this is not to be interpreted as a mathematically exact average, but as an average within what is practical in this context. It may be regarded as essentially being the average of the voltages of said alternating current power ports 110, 111, 112.

What is claimed is:

1. A method for providing an estimate of available power to an electrically powered tool, the method comprising:
   measuring all voltages between all ports at a power input with at least two ports between which there is a voltage potential;
   determining all possible voltages between said ports;
   selecting those voltages that exceed a predetermined threshold value during a certain time period;
   comparing phase relations of the selected voltages and based on a result of the comparing determining an amount and composition of available power; and
   communicating the amount and composition of available power to the electrically powered tool.

2. An electrically powered tool arrangement comprising a power input and a power output, the power input being arranged to be connected to a power source inlet and the power output being arranged to be connected to an electric motor that is comprised in an electrically powered tool, and to provide an alternating voltage with a certain controllable frequency to the electric motor,
   wherein the electrically powered tool arrangement comprises a power supply device that includes the power input, the power input comprising one neutral port and at least two alternating current power ports between which there is an alternating voltage potential, the neutral port being connected to a voltage that in normal conditions is an average of the voltages of the alternating current power ports,
   wherein the electrically powered tool arrangement comprises an input rectifier connected to the power input, the input rectifier having a positive output line and a negative output line,
   wherein the input rectifier comprises a first set of rectifying diodes connected between the alternating current power ports and the neutral port, and the positive output line,
   wherein the input rectifier comprises a second set of rectifying diodes connected between the alternating current power ports and the neutral port, and the negative output line, and
   wherein the neutral port is connected to a first rectifying diode connected to the positive output line and to a second rectifying diode connected to the negative output line.

3. An electrically powered tool arrangement comprising a power input and a power output, the power input comprising at least two ports between which there is a voltage potential and being arranged to be connected to a power source inlet and the power output being arranged to be connected to an electric motor and to provide an alternating voltage with a certain controllable frequency to the electric motor,
   wherein the electrically powered tool arrangement comprises a power supply device, the power supply device comprising a converter assembly that comprises a first converter unit and a second converter unit, each of the first and second converter units comprising a respective first inductance and second inductance connected in series with a respective first rectifying device and second rectifying device, each of the first and second converter units further comprising a respective first controllable switching device and second controllable switching device and also a respective first capacitance and second capacitance connected in parallel over the respective first and second rectifying devices, the first and second converter units being connected to each other such that parallel connections of the respective first and second controllable switching devices and first and second capacitances only are connected to each other in series, the voltage over the first and second capacitances constituting an output DC bus voltage,
   wherein each of the first and second controllable switching devices is arranged to control charge and discharge of electrical energy to and from its corresponding inductance such that the output DC bus voltage is maintained at a desired level.

4. An electrically powered tool arrangement according to claim 3, wherein the power supply device comprises a tool interface, the tool interface comprising the power output and the electric motor being comprised in an electrically powered tool.

5. An electrically powered tool arrangement according to claim 3, wherein the power supply device comprises a tool interface which is arranged to supply the DC bus voltage to a brushless direct current (BLDC) motor, the BLDC motor comprising an electric motor and an output power converter, the output power converter being arranged to convert the DC bus voltage to an AC voltage suitable for the electric motor, the AC voltage having a frequency that corresponds to a rotational speed of the BLDC motor.

6. An electrically powered tool arrangement according to claim 3, wherein the power input comprises at least two alternating current power ports and one neutral port, where the neutral port is connected to a voltage that in normal conditions is the average of the voltages of the alternating current power ports.

7. An electrically powered tool arrangement according to claim 6, wherein the power supply device comprises an input rectifier connected to the power input, the input rectifier having a positive output line and a negative output line,
wherein the input rectifier comprises a first set of rectifying diodes connected between either the alternating current power ports and the neutral port or the positive output line, and
wherein the input rectifier comprises a second set of rectifying diodes connected between either the alternating current power ports and the neutral port or the negative output line.

8. An electrically powered tool arrangement according to claim 7, wherein there are three alternating current power ports, where the neutral port is connected to a junction between the alternating current power ports where the current equals zero at an even load.

9. An electrically powered tool arrangement according to claim 8, wherein the neutral port is connected to a first rectifying diode connected to the positive output line and to a second rectifying diode connected to the negative output line.

10. An electrically powered tool arrangement according to claim 3, wherein the converter assembly further comprises a first parallel converter unit and a second parallel converter unit, each parallel converter unit comprising a respective first parallel inductance and second parallel inductance connected in series with a respective first parallel rectifying device and second parallel rectifying device, each parallel converter unit also comprising a respective first parallel controllable switch device and second parallel controllable switch device, the first parallel controllable switch device being connected between the first parallel inductance and the first parallel rectifying device and the second parallel controllable switch device being connected between the second parallel inductance and the second parallel rectifying device, the first parallel converter unit being connected in parallel with the first converter unit and the second parallel converter unit being connected in parallel with the first converter unit such that the rectifying devices and the controllable switch devices of the first converter unit and the first parallel converter unit are connected over the capacitance of the first converter unit, and such that the rectifying devices and the controllable switch devices of the second converter unit and the second parallel converter unit are connected over the capacitance of the second converter unit.

11. An electrically powered tool arrangement according to claim 3, wherein the power input is arranged for receiving a direct current (DC) voltage.

12. An electrically powered tool arrangement according to claim 11, wherein the DC voltage is supplied from a battery.

13. An electrically powered tool arrangement according to claim 3, wherein the power supply device comprises a control unit.

14. An electrically powered tool arrangement according to claim 13, wherein the control unit is arranged to determine the voltage between each port comprised in the power input, and to select those voltages that exceed a predetermined threshold value during a certain time period, the control unit further being arranged to compare the phase relations of the selected voltages and based on this comparison determine the amount and composition of available power.

15. An electrically powered tool arrangement according to claim 14, wherein the control unit is arranged to communicate the amount and composition of available power, enabling control of the motor in dependence of the amount and composition of available power.

16. An electrically powered tool arrangement according to claim 3, wherein the power supply device comprises a control unit, the control unit being arranged to detect if there is a neutral connection at the power input, the control unit further being arranged to control the output voltage in dependence of the presence of the neutral connection.

17. An electrically powered tool arrangement according to claim 16, wherein the control unit further is arranged to detect possible presence of electrical power at alternating current power ports, the control unit further being arranged to control the output voltage in dependence of the loss of a phase connection.

18. An electrically powered tool arrangement according to claim 17, wherein the power supply unit is separate from the electrically powered tool, the control unit being arranged to detect if the electrically powered tool is connected to the tool interface, and if the electrically powered tool is connected to the tool interface, the control unit is further arranged to indicate at a display, comprised in the power supply device, what type of electrically powered tool that is connected to the tool interface.

19. An electrically powered tool arrangement according to claim 3, wherein the power supply device comprises an output power converter, arranged to convert the output DC bus voltage to an AC voltage suitable for the electric motor, the AC voltage having a frequency that corresponds to a rotational speed of the electrically powered tool.

20. An electrically powered tool arrangement according to claim 3, wherein the power supply device comprises a braking resistor assembly that is arranged to be engaged in dependence of the output DC bus voltage.

* * * * *